United States Patent [19]

Knox et al.

[11] 4,034,377

[45] July 5, 1977

[54] FERRITE CIRCULATORS AND ISOLATORS AND CIRCUITS INCORPORATING THE SAME

[75] Inventors: Robert M. Knox, La Grange; Peter P. Toulios, Westchester, both of Ill.

[73] Assignee: Epsilon Lambda Electronics Corporation, Batavia, Ill.

[22] Filed: Feb. 17, 1976

[21] Appl. No.: 658,412

[52] U.S. Cl. .................................. 343/180; 325/24; 333/1.1; 333/24.2; 333/95 S

[51] Int. Cl.[2] ....................... H04L 5/14; H04B 1/48; H01P 1/36; H01P 1/38

[58] Field of Search ................. 333/1.1, 24.2, 84 R, 333/95 R, 95 S; 325/24; 343/180

[56] References Cited

UNITED STATES PATENTS

| | | | |
|---|---|---|---|
| 2,946,025 | 7/1960 | Miller | 333/24.2 |
| 3,076,946 | 2/1963 | Hewitt, Jr. | 333/24.2 |
| 3,099,794 | 7/1963 | Essam et al. | 325/24 |
| 3,103,639 | 9/1963 | Reggia | 333/24.2 |
| 3,425,001 | 1/1969 | Hershenov | 333/1.1 |
| 3,609,675 | 9/1971 | Abele | 333/95 S |
| 3,614,670 | 10/1971 | Wilson | 333/1.1 |
| 3,922,620 | 11/1975 | Deutsch | 333/1.1 |
| 3,995,238 | 11/1976 | Knox et al. | 333/95 S X |

*Primary Examiner*—Paul L. Gensler
*Attorney, Agent, or Firm*—Vogel, Dithmar, Stotland, Stratman & Levy

[57] ABSTRACT

A ferrite circulator for use in the frequency range 1 GHz to 1,000 GHz, wherein a ferrite cylinder is disposed in a junction of three equiangularly arranged high permittivity dielectric waveguides that are adjacent to a conductive image plane with a plastic film therebetween and a magnet establishing magnetic field in the ferrite cylinder normal to the image plane; also disclosed is a ferrite isolator for use in the frequency range from 1 GHz to 1,000 GHz including a ferrite slab disposed adjacent to one side of a high permittivity dielectric waveguide disposed adjacent to a conductive image plane with a plastic film therebetween, a resistance film disposed adjacent to a conductive image plane, a resistance film disposed adjacent to the ferrite slab, and a magnet for establishing a magnetic field in the waveguide and the ferrite slab disposed normal to the image plane; there further are disclosed switches, modulators, phase shifters and transceivers incorporating such ferrite circulators and isolators.

43 Claims, 15 Drawing Figures

FERRITE CIRCULATORS AND ISOLATORS AND CIRCUITS INCORPORATING THE SAME

BACKGROUND OF THE INVENTION

The present invention relates generally to improvements in circuits designed for operation in the frequency range 1 GHz to 1,000 GHz and employing ferrite circulators and isolators.

Standard practice heretofore in building communications systems for use in the frequency range from 1 GHz to 300 GHz has been to utilize metallic waveguide, coaxial, microstrip, stripline or slotline waveguide transmission lines. Certain of these prior systems have incorporated ferrite devices, but there has been a substantial mismatch between the ferrite cylinder and the transmission lines, thus making it difficult to operate over a wide frequency range. Furthermore, ferrite devices such as ferrite circulators and ferrite isolators have not been utilized in insular waveguide transmission line circuitry heretofore.

SUMMARY OF THE INVENTION

The present invention provides ferrite circulators and ferrite isolators for use in insular waveguide transmission systems, and circuits incorporating such ferrite devices.

This is accomplished in the present invention, and it is an object of the present invention to accomplish these desired results, by providing a circulator for use in the frequency range from about 1 GHz to about 1,000 GHz comprising a conductive image plane, a thin film of synthetic organic plastic resin disposed between and secured to both the image plane and the waveguides, the thin film being low loss in character having a low permittivity compared with that of the dielectric waveguides, the ratio between the thickness of the thin film and the square root of the cross-sectional area of the dielectric waveguides being in the range from about 0.02 to about 1.0, three elongated high permittivity dielectric waveguides of finite cross section adjacent to the conductive image plane, the waveguides being arranged in an equiangular Y-shape and integrally connected at a common junction and each including a port, a ferrite cylinder in the waveguide junction spaced from the longitudinal edges thereof and having the axis of the ferrite cylinder disposed essentially normal to the image plane, and means for establishing a magnetic field in the ferrite cylinder extending essentially normal to the image plane, whereby microwave energy in the frequency range inserted in a first port is essentially all transmitted with little attenuation to a second port and essentially none transmitted to the third port.

Another object of the invention is to provide a switch incorporating a ferrite circulator of the type set forth herein above, the means for establishing the magnetic field in the ferrite cylinder being operable to establish a field of a first polarity therein and alternatively a field of a second polarity therein opposite in sense to the first polarity, whereby reversing the polarity of the magnetic field through the ferrite cylinder switches transmission of the microwave energy between the second and third ports in the ferrite cylinder.

Yet another object of the invention is to provide a ferrite isolator for use in the frequency range from about 1 GHz to about 1,000 GHz comprising a conductive image plane, an elongated high permittivity dielectric waveguide of finite cross section adjacent to the conductive image plane, a thin film of synthetic organic plastic resin disposed between and secured to both the image plane and the waveguides, the thin film being low loss in character having a low permittivity compared with that of the dielectric waveguides, the ratio between the thickness of the thin film and the square root of the cross-sectional area of the dielectric waveguides being in the range from about 0.02 to about 1.0, a ferrite slab adjacent to one side of the waveguide extending longitudinally for a predetermined length therealong, a resistance film disposed adjacent to the ferrite slab, and means for establishing a magnetic field in the waveguide and the ferrite slab extending substantially normal to the image plane, whereby microwave energy in the frequency range is transmitted through the waveguide past the ferrite slab with little attenuation in a forward direction and with high attenuation in the reverse direction.

Still another object of the invention is to provide a ferrite switch incorporating a ferrite isolator as set forth hereinabove, wherein the means for establishing a magnetic field in the dielectric waveguide and the ferrite slab provides a magnetic field of a first polarity and alternatively of a second polarity opposite in sense to the first polarity, whereby reversing the direction of the magnetic field switches the direction of transmission with little attenuation of the microwave energy through the waveguide past the ferrite slab.

Yet another object of the invention is to provide a modulator incorporating a ferrite isolator as set forth hereinabove, wherein the magnetic field can have the polarity thereof changed and may have the magnitude thereof changed thereby to modulate the microwave energy transmitted through the waveguide past the ferrite slab.

A further object of the invention is to provide a phase shifter utilizing a ferrite isolator as set forth hereinabove.

A still further object of the invention is to provide a transceiver incorporating therein a ferrite circulator and a ferrite isolator as set forth hereinabove.

Further features of the invention pertain to the particular arrangement of the parts of the ferrite circulators and ferrite isolators and the circuit elements interconnected thereto, whereby the above outlined and additional operating features thereof are attained.

The invention, both as to its organization and method of operation, together with further features and advantages thereof will best be understood with reference to the following specification taken in connection with the accompanying drawings.

DESCRIPTION OF THE PREFERRED EMBODIMENTS

Figures 1, 2, 3:
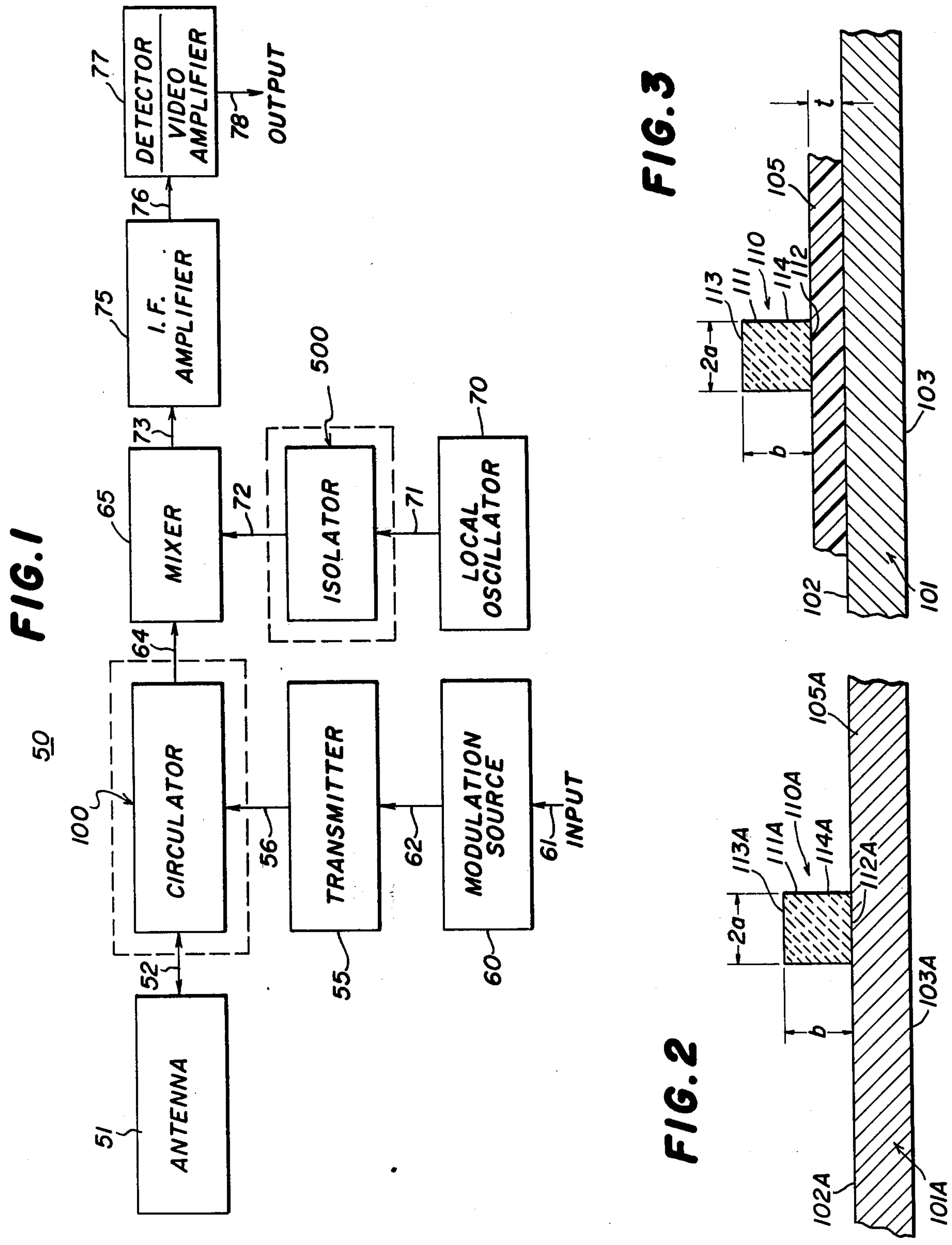
FIG. 1 is a diagram in block form of a transceiver forming a part of a 60 GHz communications system useful for short range communication, and incorporating therein the present invention.
FIG. 2 is a schematic representation of an image waveguide transmission line.
FIG. 3 is a schematic representation of an insular waveguide transmission line utilized herein.

Referring to FIG. 1 of the drawings, there is shown a block diagram of a typical transmitter-receiver or transceiver 50 made in accordance with and embodying the principles of the present invention; the transceiver 50 is useful in various electronic systems such as those for communication, radar and navigation. Such a system is characterized by the fact that the transmitter and receiver components are connected to a single common antenna, rather than having separate transmitter and receiver antennas. The transmitter and receiver signals are typically at the same frequency or at closely spaced frequencies, whereby frequency filtering or multiplexing cannot be used to separate the transmitted signals from the received signals.

The transceiver 50 of FIG. 1 includes an antenna 51 which is connected by a suitable transmission line 52 to a circulator 100 made in accordance with and embodying the principles of the present invention. A second input to the circulator 100 is along a transmission line 56 from a transmitter 55, the transmitter 55 also having an input from a modulation source 60 through a transmission line 62, the modulation source 60 further having an input 61.

The circulator 100 has an output along a transmission line 64 to a mixer 65. A second input to the mixer 65 is from an isolator 500 made in accordance with and embodying the principles of the present invention, the input to the isolator 500 being from a local oscillator 70 through a transmission line 71, and the output from the isolator being along a transmission line 72 to one of the inputs to the mixer 65. The IF frequency which is the output from the mixer 65 is conducted by a transmission line 73 to an IF amplifier 75 having its output connected by a transmission line 76 to a detector-video amplifier 77, the output from the detector-video amplifier 77 being at a transmission line 78.

The various transmission lines 52, 56, 64, 71 and 72 described above are insular waveguide transmission lines as illustrated in FIG. 3 of the drawings. Referring first to FIG. 2 of te drawings, there is illustrated an image waveguide transmission line 110A which includes a conductive image plane in the form of a plate 101A and a dielectric waveguide 111A resting upon and in intimate contact with the upper surface 102A of the base plate 101A. The dielectric waveguide 111A includes a bottom 112A, a top 113A parallel to the bottom 112A and a pair of sides 114A parallel to each other and perpendicular to both the bottom 112A and the top 113A. The width of the dielectric waveguide 110A is indicated as being $2a$ and the height is illustrated as being $b$, the width and height being equal as illustrated, whereby the dielectric waveguide 111A is square in cross section.

Referring to FIG. 3, there is illustrated an insular waveguide transmission line 110 which also includes a base plate 101 and a dielectric waveguide 111 corresponding respectively to the base plate 101A and the dielectric waveguide 111A of the image waveguide of FIG. 2, but there is disposed between the base plate 101 and the dielectric waveguide 111 a plastic film 105, the thickness of the plastic film 105 being designated as $t$.

The base plates 101 and 101A must be both a good electrical conductor so as to provide the necessary electrical interconnection where required, and also a good heat conductor to provide a heat sink for receiving the heat generated during the operation of the electrical system wherein the transmission lines 110 and 110A are used. Suitable examples of such a material are the metals, the preferred metal being aluminum.

The dielectric waveguide 111 is formed of a low loss ceramic and must possess a relatively high permittivity, i.e., the permittivity of the dielectric waveguide 111 should be 4 or greater, and the ceramic also must have a low loss tangent, i.e., the loss tangent should be less than about 0.001. Examples of fired ceramics useful in the present invention to form the dielectric waveguide 111 are alumina which has a permittivity of about 10 and a loss tangent of about 0.0001, titanium dioxide having a permittivity of about 100 and a loss tangent of about 0.005; the barium titanates having a permittivity in the range of from about 300 to about 2000 and having a loss tangent in the range from about 0.0005 to about 0.001; and fused quartz having a permittivity of about 4 and a loss tangent of about 0.0001, and ferrite materials having a permittivity from about 12 to about 16 and a loss tangent from about 0.0006 to about 0.001. Single crystal ceramics may also be utilized including sapphire having a permittivity of 11 and a loss tangent of from about 0.0005 to about 0.0001; silicon having a permittivity of 12 and a loss tangent of about 0.0002; and gallium arsenide having a permittivity of about 11 and a loss tangent of about 0.0005. The dielectric waveguide 111 can also be formed of a synthetic organic plastic filled with one of the ceramic materials specified above. In such a case the plastic material may be polystyrene or a tetrafluoroethylene polymer such as that sold under the trademark "Teflon". Such waveguide will have a permittivity from about 4 to about 25 and a loss factor of about 0.001. Although the dielectric waveguide 111 has been illustrated as being square in cross section, it will be understood that other shapes may be used including rectangular, hemi-spherical, trapezoidal, triangular, hexagonal, and the like. In general, any configuration may be utilized which provides a flat bottom 112 useful for attachment to the plastic film 105.

The film 105 is formed of a suitable synthetic organic resin, the resin having a low permittivity, i.e., less than 3, and being low loss of character and having a loss tangent less than about 0.001. The film 105 extends laterally beyond the sides 114 of the dielectric waveguide 111 and is intimately connected to both the base plate 101 and the dielectric waveguide 111 throughout the contacting and adjacent surfaces thereof. The film 105 is preferably formed of a polyethylene resin or a polypropylene resin or a tetrafluoroethylene resin, such as that sold under the trademark "Teflon".

In accordance with the present invention, the ratio between the thickness of the film 105 and the thickness of the dielectric waveguide 111 i.e., the ratio of $t/b$, is in the range from about 0.02 to about 1.0.

When the waveguide 111 has a cross section other than square, the height of the waveguide, i.e., $b$, is equivalent to the square root of the cross sectional area of the dielectric waveguide 111, i.e., $\sqrt{A}$, and in that case the ratio of $t/\sqrt{A}$ is also in the range from about 0.02 to about 1.0. The provision of the plastic film 105 having a thickness $t$ such that the $t/b$ ratio is at least 0.02 eliminates one of the problems encountered in use of the image waveguide 111A. More particularly, it was difficult to maintain manufacturing tolerances of the parts so as to provide no gaps between the bottom 112A of the dielectric waveguide 111A and the top surface 102A of the base plate 101A. Such gaps adversely affect the performance and utility of the image waveguide. The film 105 also provides a more convenient manner of attaching the dielectric waveguide 111 to the base plate 101, the image waveguide 111A being attached with an adhesive which generally adds more loss to the system then with the use of the plastic film 105. Recapitulating, the use of a plastic film having a thickness $t$ so that the $t/b$ ratio is 0.02 or greater eliminates the extreme sensitivity at the very small gaps of the guide wavelength or propagation velocity encountered in the image waveguide transmission line 110A. If the $t/b$ ratio is greater than 1.0, there is essentially no guide wavelength dependence on the image plane which means that the image plane provides no suppression of the $E_{11}x$ mode, i.e., the horizontally polarized counterpart of the desired $E_{11}y$ mode. By limiting the maximum thickness of the film 105, some propagation velocity or guide wavelength dependence is retained because field imaging occurs and thus a boundary condition is established for suppression of the horizontal field of the $E_{11}x$ mode.

In order to attach the thin plastic film 105 to both the base plate 101 and the associated dielectric waveguide, the base plate 101 is heated to soften the plastic film until the surface liquifies, after which the parts are cooled to room temperature. When the film 105 is made the polyethylene resin, it must be heated to a temperature of about 180° F. Polypropylene resins must be heated to a higher temperature, and tetrafluoroethylene resins must be heated to even higher temperatures.

The insular waveguide transmission line 110 is useful in the range from about 1 GHz to about 1,000 GHz. At frequencies below 1 GHz, the dimensions of the parts are too large in cross section and the guide wavelength too large for practical integrated circuit use. At frequencies above 1,000 GHz, the dimensions of the parts are too small for reasonable dimensional tolerance control during manufacture. Also most suitable dielectric materials are too high in attenuation at such frequencies.

As stated above, the permittivity of the plastic film 105 should be low compared to that of the dielectric waveguide 111. Such a relationship insures good guideability of the electromagnetic energy by the waveguide 111, and further insures that corners can be turned within a reasonably small radius in the dielectric waveguide 111 without excess radiation loss. The minimum value of the ratio between the permittivity of the dielectric waveguide 111 and the permittivity of the plastic film 105 is about 2.0:1.

If the dielectric waveguide 111 has a rectangular cross section, it is preferred that the ratio of its width to its height, i.e., the ratio of the dimensions $2a/b$ is in the range from about 0.5 to about 2. This insures optimum operation of the insular waveguide transmission line 110. A square cross section gives the highest percent of operating bandwidth for single mode propagation.

In a preferred form of the insular waveguide transmission line 110 for use at frequencies of about 60 GHz, the parts have the following dimensions: $2a$ equals 0.040 inch; $b$ equals 0.040 inch; the dielectric waveguide 111 is formed of alumina having a permittivity of 9.8 and a loss factor of 0.0001; the plastic film 105 has a thickness of 0.010 inch and is formed of polyethylene having a permittivity of 2.25 and a loss factor of 0.0002; the $t/b$ ratio equals 0.25; and the ratios between the permittivities is 4.36.

Further details of the composition, construction and operation of the transmission lines 110 and 110A are set forth in our co-pending application Ser. No. 592,065 filed June 30, 1975, for RECEIVER MODULE AND COMPONENTS THEREOF. the disclosure of which is incorporated herein by reference.

Figure 4:
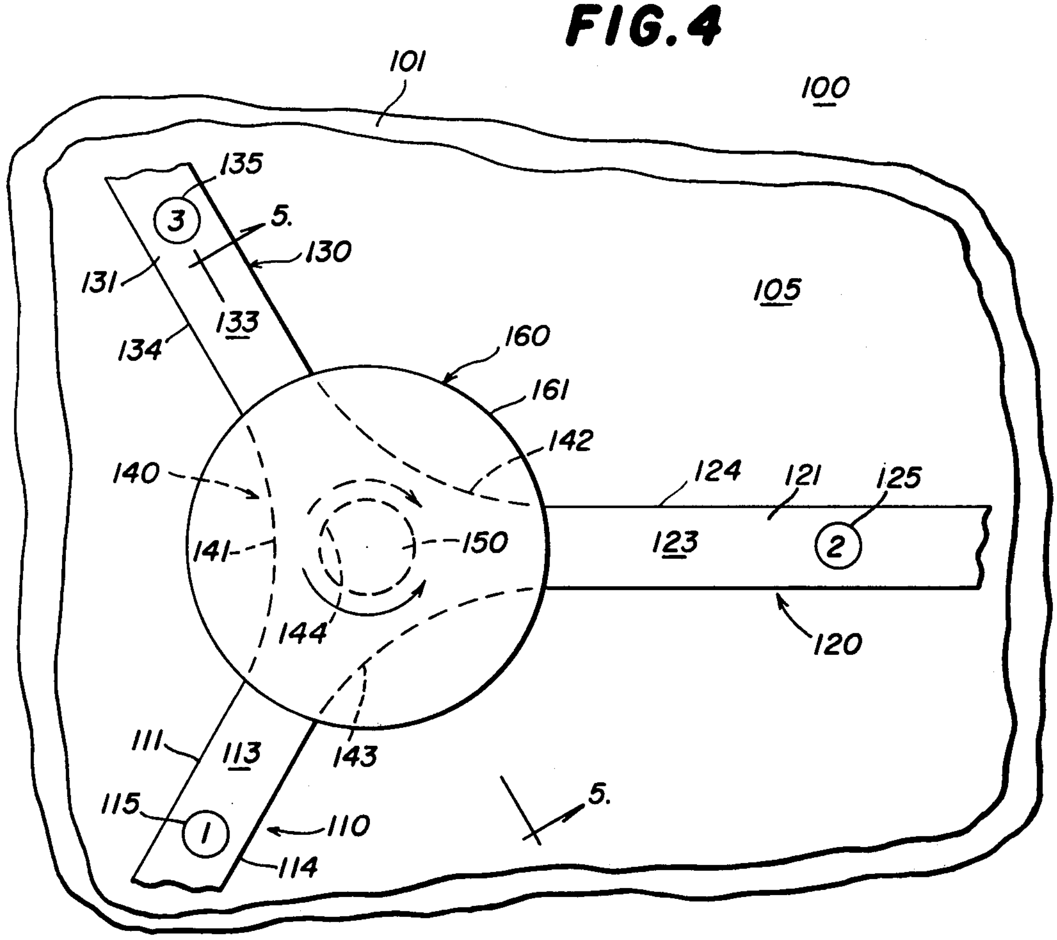
FIG. 4 is a fragmentary plan view on an enlarged scale of a first preferred embodiment of a ferrite circulator made in accordance with and embodying the principles of the present invention.
Figure 5:
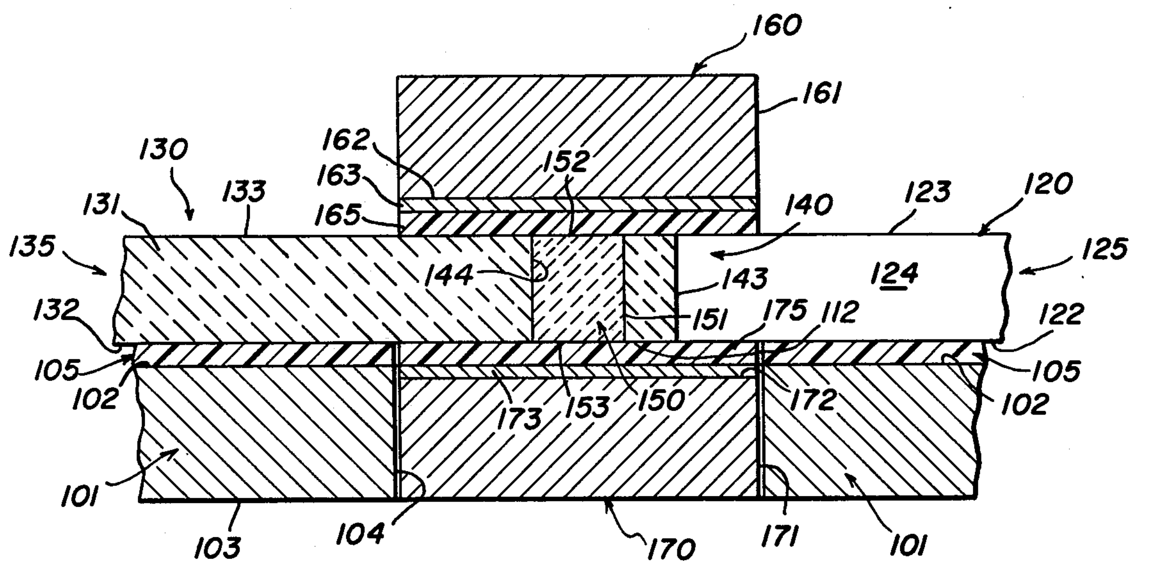
FIG. 5 is a partial view on a further enlarged scale in vertical section through the ferrite circulator of FIG. 4 as seen in the direction of the arrows 5—5 therein.

In the transceiver 50 of FIG. 1, the outgoing transmitter signals are separated from the incoming receiver signals by the use of a ferrite circulator, a first preferred embodiment of such a ferrite circulator 100 being illustrated in FIGS. 4 and 5 of the drawings. The circulator 100 includes a portion of the base plate 101 referred to above in describing the transmission line 110 in FIG. 3, and the plastic film 105 secured to the upper surface 102 of the base plate 101. The base plate 101 and the film 105 have aligned openings designated by the numeral 104 therethrough substantially normal thereto, the opening 104 being circular in shape.

The circulator 100 also includes three transmission lines 110, 120 and 130 having straight sections that are equiangularly arranged with respect to a junction 140 which serves to join the adjacent ends of the transmission lines 110, 120 and 130. The transmission line 110 is like that described above with respect to FIG. 3 but further includes a first inlet port 115. The transmission line 120 is likewise of the same construction as the transmission line 110 described, whereby like parts have been given like numbers in the 120 series. The transmission line 120 is also provided with a second inlet port 125 disposed to the right in FIG. 4. The third transmission line 130 is likewise of the same construction as the transmission line 110, whereby like numerals in the 130 series have been applied to like parts thereof, the transmission line 130 having a third inlet port 135 therefor as illustrated in the upper left portion of FIG. 4. As stated before, the transmission lines 110, 120 and 130 are equiangularly arranged with respect to the junction 140 therebetween, the junction 140 having curved sides 141 joining the transmission lines 110 and 130, a curved side 142 joining the transmission lines 120 and 130 and a curved side 143 joining the transmission lines 110 and 120. There is formed centrally in the junction 140 a cylindrical opening 144 which is concentric with the opening 104 in the base plate 101.

Disposed within the junction opening 144 is a ferrite cylinder or post 150 having an outer surface which is disposed against the inner surface of the opening 144 and a pair of flat and parallel end surfaces 152 and 153, the ferrite cylinder 150 being circular in cross section, whereby the end surfaces 152 and 153 are likewise circular.

As illustrated, a first magnet member 160 is provided overlying the junction 140 (see FIG. 5), and a second magnet member 170 is provided in the opening 104 in the base plate 101 and below the junction 140. The first magnet member 160 has an outer cylindrical surface 161 that surrounds a pole face 162 disposed essentially parallel to the top surfaces 113, 123 and 133 of the transmission lines 110, 120 and 130, respectively and the upper end surface 152 of the ferrite cylinder 150. The pole face 162 is covered by a metal film 163, and the metal film 163 in turn is covered by a plastic film 165 that is in contact with the top surfaces 113, 123 and 133 of the waveguides and the top surface 152 of the ferrite cylinder 150.

The second magnet member 170 has an outer cylindrical surface 171 that fits within the opening 104 and surrounds a pole face 172 disposed toward the junction 140 and parallel to the lower end surface 153 of the ferrite cylinder 150. The pole face 172 is covered by a metal film 173, and the metal film 173 is in turn covered by a plastic film 175 that is in contact with the bottom surfaces 112, 122 and 132 of the waveguides and the bottom surface 153 of the ferrite cylinder 150. The plastic films 165 and 175 are preferably of the same composition and the same thickness as the film 105 described above.

The action of the circulator 100 will now be explained by reference to FIG. 4 of the drawings. If a signal having a frequency of for example 60 GHz is incident at the port 115, with one polarity of the magnet members 160 and 170, the signal will emerge at the port 125, but not at the port 135, except for some leakage due to the fact that the circulator 100 does not provide infinite isolation. The leakage signal at the port 135 is 20 to 30 db. below the signal at the port 125. Similarly, if a signal is incident on port 125, it will emerge at the port 135 and not at the port 115, except for leakage. If a signal is incident on the port 135, it will emerge at the port 115 and not at the port 125, except for leakage. This circulation direction is indicated by the solid curved arrow in FIG. 4.

If the direction of the magnetic field established by the permanent magnet members 160 and 170 is now reversed, the circulation direction will in turn be reversed, i.e., the circulation will be in the direction of the dashed line curved arrow in FIG. 4. In this mode of operation, if a signal is incident on the port 115, it will emerge at the port 135, and not at the port 125, except for leakage. Similarly, if a signal is incident on the port 125, it will now emerge at the port 115 and not at the port 135, except for leakage. Finally, if a signal is incident on the port 135, it will emerge at the port 125 and not at the port 115, except for leakage.

This action of the ferrite circular 100 can be explained as follows. The wave incident at the port 115 of FIG. 4 is the fundamental $E_{11}y$ mode of the dielectric waveguide 111 with the RF electrical field (principal component) polarized to the direction of the applied DC magnetic field provided by the permanent magnet members 160 and 170. Thus the ferrite post 150 will support two electromagnetic modes characteristic of such a tensor magnetic medium. Two mutually orthogonal components of the RF magnetic field are excited in the plane perpendicular to the DC magnetic field vector, i.e., the plane parallel to the end surfaces 152 and 153 of the ferrite cylinder 150. One mode has a lefthand circularly polarized RF magnetic vector and has increasing field intensities toward the left side of the input port 115. The other mode has a righthand circularly polarized RF magnetic vector and has increasing field intensities toward the right side of the input port 115. The combination of the two rotating modes produces a field pattern which has its field-displacement peak between the ports 115 and 125, and a null at the isolated port 135. Both the electric and magnetic field configurations established by the superposition of these two modes result in a pattern for which Poynting vectors exist at the input port 115 and the output port 125 and are oppositely directed, whereas the Poynting vector vanishes at port 135. Stated briefly, the circulation principle is based on the RF field distortion within the ferrite cylinder 150, which RF field distortion is of the same general nature as that present in field-displacement devices.

In the ferrite circulator 100, the pole face region thereof employs the insular waveguide principle of insulating the propagating (as in this case circulating) mode from the thin metal films 163 and 173 on the magnet pole faces 162 and 172. Not only does this reduce conductor losses, but it also maintains mode purity in the region of the junction 140. If further metalization were to be introduced in the high field region of the ferrite post surfaces 152 and 153, mode transformation would occur that would subvert the uniform excitation of the circulating modes, and thereby tend to reduce the circulator isolation. In addition, radiation would result because of inefficient coupling to the circulating mode.

The frequency of operation of the ferrite circulator 100 is basically determined by the dimension of the ferrite cylinder 150 and the strength of the externally applied magnetic field provided by the magnet members 160 and 170. When the microwave energy being processed is at 60 GHz, the ferrite cylinder 150 has a diameter of 0.050 inch, the magnet members 160 and 170 have an outer diameter of 0.250 inch and a height of 0.125 inch and provide a DC magnetic field of 2000–3000 oersteds. The magnetic bias field requirement increases in proportion to frequency, and the dimensions of the several parts decrease in inverse proportion to frequency. In general, the diameter of the ferrite cylinder 150 is one-half of the free space wavelength of the energy being transmitted, which diameter is also on the order of one-half the guide width dimension in the region of the junction 140, and the width of the waveguide adjacent to the ferrite cylinder 150 is approximately one fourth the width of the waveguide 111.

The ferrite isolator 100 is illustrated in FIG. 1 as forming the interconnection among the antenna 51, the transmitter 55 and the mixer 65. The antenna 51 is coupled to the port 115, the mixer 65 is coupled to the port 125 and the transmitter is coupled to the port 135. The output of the transmitter 55 is thereby delivered to the antenna 51 with only a small leakage to the receiver through the mixer 65. This alows sufficient coupling of the power from the transmitter 55 to the antenna 51 without loss of significant power into the mixer 65. This also prevents the possibility of damage to the mixer 65 and subsequent stages in the receiver section due to high power signals coupling into the mixer 65. Similarly, received signals are efficiently coupled into the mixer 65 with very little leakage into the transmitter 55.

In a constructional example of the circulator 100, the several transmission lines 110, 120 and 130 have the dimensions and are made of the materials described above with respect to the transmission line 110. The curved sides 141, 142 and 143 of the junction 140 have a radius or curvature to reduce radiation due to the change in direction of wave propagation around the ferrite cylinder 150. The radius of curvature of the curved sides 141, 142 and 143 is 0.160 inch corresponding to a ratio between the radius of curvature (R) and the width of the waveguide (2*a*) of 4 for a ferrite circulator 100 operating at approximately 60 GHz. This ratio may be as small as 2, and the greater the ratio the less the loss from radiation, an optimum workable ratio being 4 which provides sufficient energy guidability around the ferrite cylinder 150. The pole face of each of the magnet members 160 and 170 is covered by a metal film, a preferred film being gold, and other suitable materials being copper and silver. The thickness of the metal films 163 and 173 is preferably one to two microns, a constructional example being one micron. The metal films 163 and 173 are in turn covered by a plastic film, a preferred plastic being polyethylene which is ten mils. thick. The polyethylene films 165 and 175 are heat sealed to the associated pole face to provide magnet members that are unitary in construction that can be inserted as required about the junction 140.

The ferrite cylinder 150 may be formed of any suitable ferrite material, i.e., an organic salt of the formula $MFe_2O_4$, where M represents a bivalent metal. Such materials are magnetic and are readily formed as sintered powders that can be pressed and sintered into the desired form such as the ferrite cylinder 150. Such materials have extremely low core losses making them highly advantageous for the described use. In the ferrite circulator 100, a preferred ferrite material is a magnesium ferrite of the type TT1-3000. Another preferred form of ferrite cylinder 150 is a nickel-zinc ferrite of the type TT2-111. Such ferrite cylinders have relatively low saturation magnetization, a dielectric constant in the range from about 11 to 14, and a low dielectric loss tangent, i.e., less than about 0.001. The very small difference between the typical dielectric constant of 13 for the ferrite cylinder 150 and the dielectric constant of 10 for the alumina waveguide 111 provides for a good match therebetween, and particularly as compared to the match between ferrite materials and an air-filled rectangular waveguide. The good electrical match between the ferrite cylinder 150 and the waveguides 110, 120 and 130 at the junction 140 permits wide band operation, i.e., the ferrite circulator 100 is operable over a wide frequency range. In addition, there is low insertion loss at any of the ports 115, 125 and 135, while providing high isolation between the ports. The circulator 100 is simple, compact, and easy to build into the dielectric waveguide medium, i.e., it is simply necessary to provide a hole in the waveguide medium into which the ferrite cylinder 150 is dropped. The configuration makes it unnecessary to utilize ferrite materials having a high saturation magnetization, and relatively low magnetic biasing fields and thus relatively small magnet members 160 and 170 are utilized. As a result of all these factors, the ferrite circulator 100 is a low cost device.

The magnetic members 160 and 170 are independent elements and comprise a magnet carrying the thin metal films 163 and 173, respectively, covered by the polyethylene plastic films 165 and 175. The magnetic members 160 and 170 are fabricated as separate elements and are subsequently inserted onto the junction 140 with the ferrite cylinder 150 disposed therebetween, the magnetic members 160 and 170 being held in place by insulated support structure (not shown).

Figure 6:
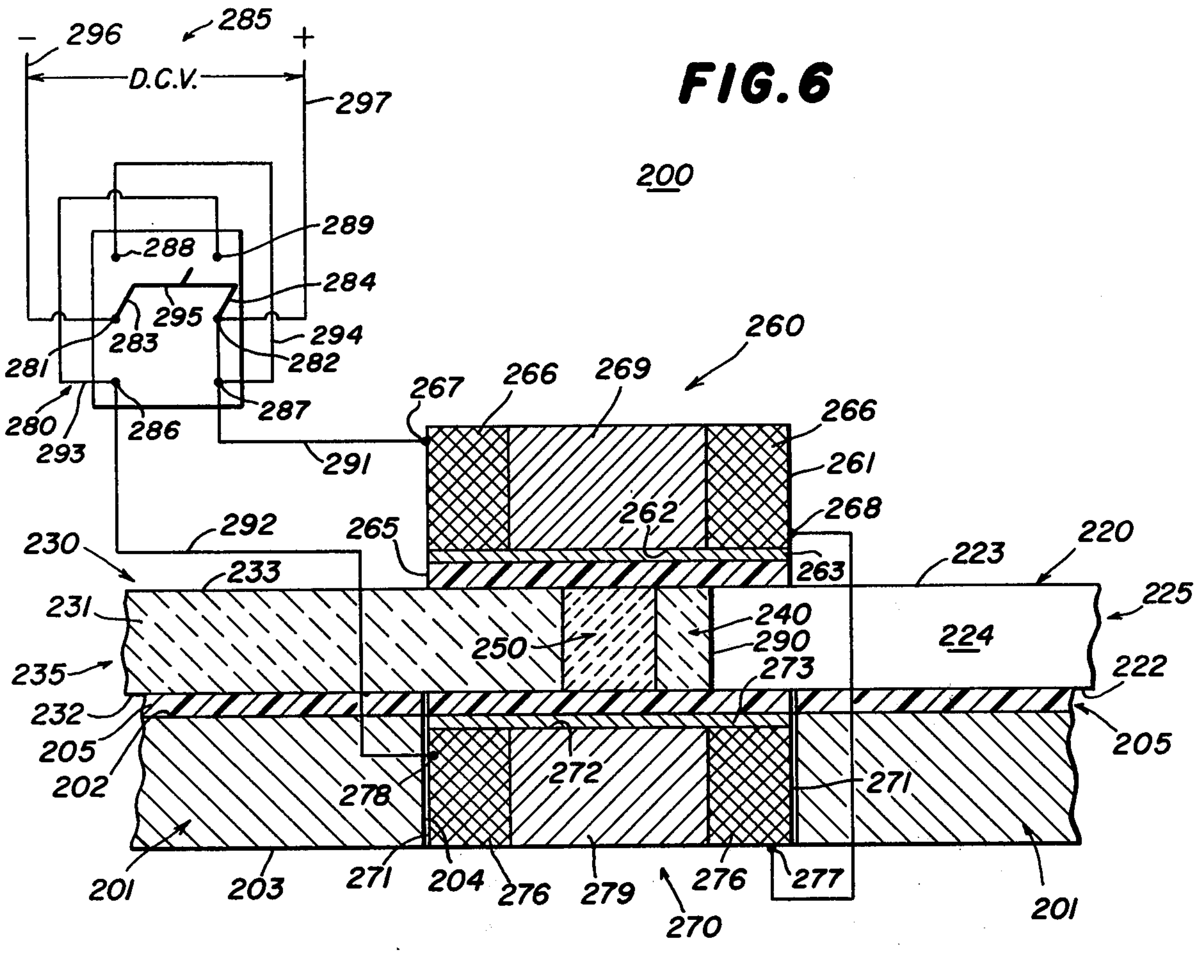
FIG. 6 is a cross sectional view similar to FIG. 5 but showing the use of an electromagnet in place of the permanent magnets of FIG. 5.

There is illustrated in FIG. 6 of the drawings, a switch 200 utilizing a ferrite circulator similar to the ferrite circulator 100 described above, but substituting for the permanent magnet members 160 and 170 thereof, electromagnets 260 and 270, respectively. Since many of the parts of the switch 200 are constructed and arranged like parts in the circulator 100, like reference numerals in the 200 series have been applied to those parts in the switch 200 that correspond to parts in the circulator 100.

The electromagnetic 260 includes a magnet coil 266 having terminals 267 and 268, the magnet coil 266 being disposed about a magnetic core 269. The electromagnet 270 has a magnet coil 276 provided with terminals 277 and 278, the magnet coil 276 being disposed about a magnetic core 279. In order to reverse the direction of the magnetic field generated by the electromagnets 260 and 270, a reversing switch 280 has been provided. The reversing switch 280 has a pair of central terminals 281 and 282 which are respectively connected by conductors 296 and 297 to a suitable source 285 of DC potential. The terminals 281 and 282 are also connected to a handle 295 that carries switch blades 283 and 284, the switch blade 283 being selectively connectable to a terminal 286 or a terminal 288, while the switch blade 284 is selectively connectable to a terminal 287 or a terminal 289.

The electromagnet terminal 267 is connected by a conductor 291 to the switch terminal 287, and the electromagnet terminal 268 is connected by a conductor 290 to the electromagnet terminal 277. The electromagnet terminal 278 is connected by a conductor 292 to the switch terminal 286. The switch terminal 286 is in turn connected by a conductor 293 to the switch terminal 289, and the switch terminal 287 is connected by a conductor 294 to a switch terminal 288.

Utilizing the reversing switch 280, the polarity of the DC current applied to the electromagnets 260 and 270 can be reversed, thus reversing the direction of the magnetic field produced by the electromagnets 260 and 270 and applied to the ferrite cylinder 250 and the adjacent portion of the junction 240. If the reversing switch 280 is first placed in a position to create a magnetic field of a first polarity from the electromagnets 260 and 270 through the junction 240 and the ferrite cylinder 250, then electromagnetic energy inserted in the inlet port 215 (not shown) is transmitted essentially unattenuated to the outlet port 255 and essentially no energy is transmitted to the outlet port 235. If the position of the reversing switches 280 is reversed, then the magnetic field generated by the electromagnets 260 and 270 will be reversed, and as a consequence electromagnetic energy inserted in the inlet port of the switch 200 will be directed now to the outlet port 235 with little attenuation, while substantially no energy is directed to the outlet port 225. It will be appreciated therefore that the reversing switch 280 of the switch 200 can be used to switch or divert electromagnetic energy incident at the inlet port to either the outlet port 225 or the outlet port 235 as desired by simply changing the position of the reversing switch 280.

Figure 7:
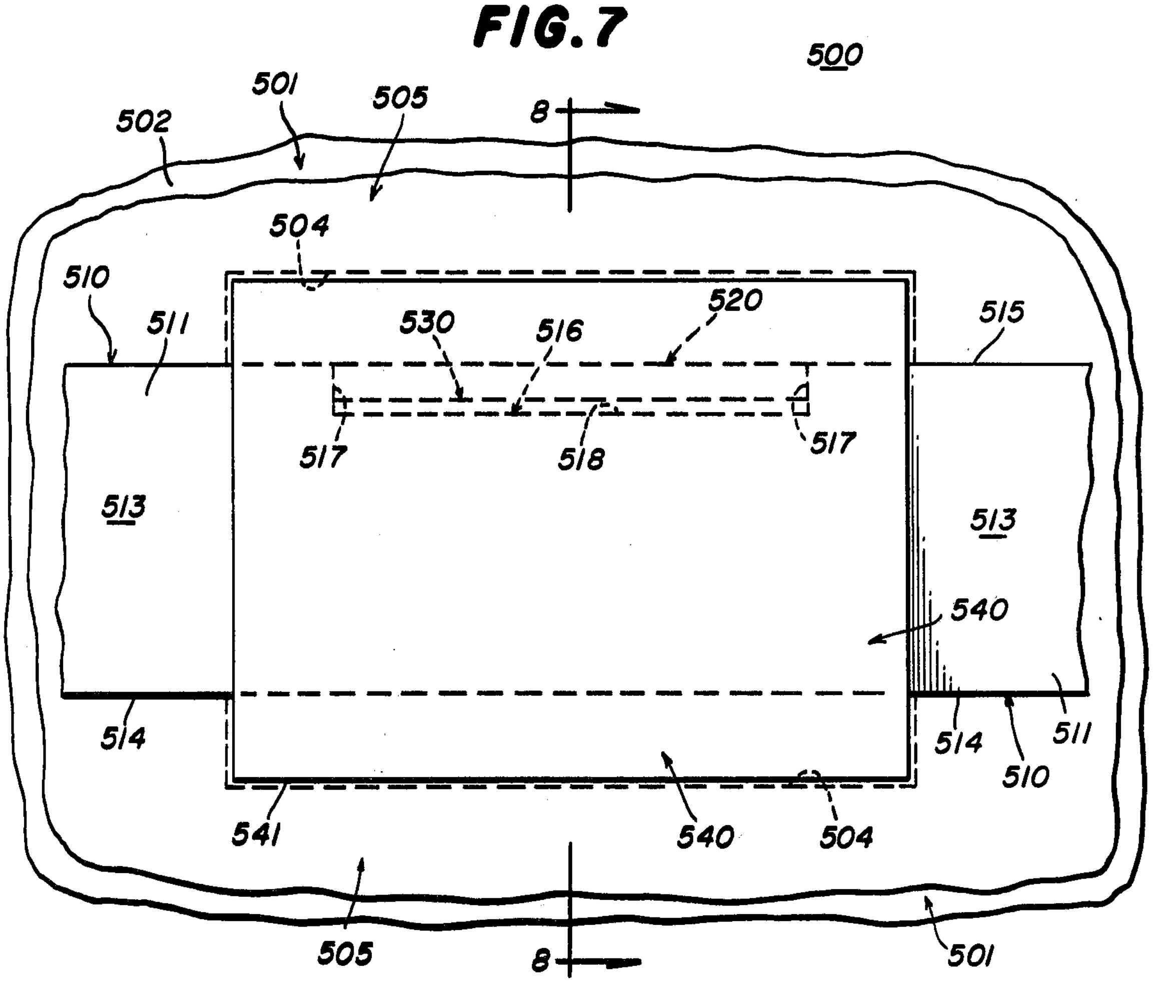
FIG. 7 is an enlarged fragmentary plan view of a first preferred embodiment of a ferrite isolator made in accordance with and embodying the principles of the present invention.
Figure 8:
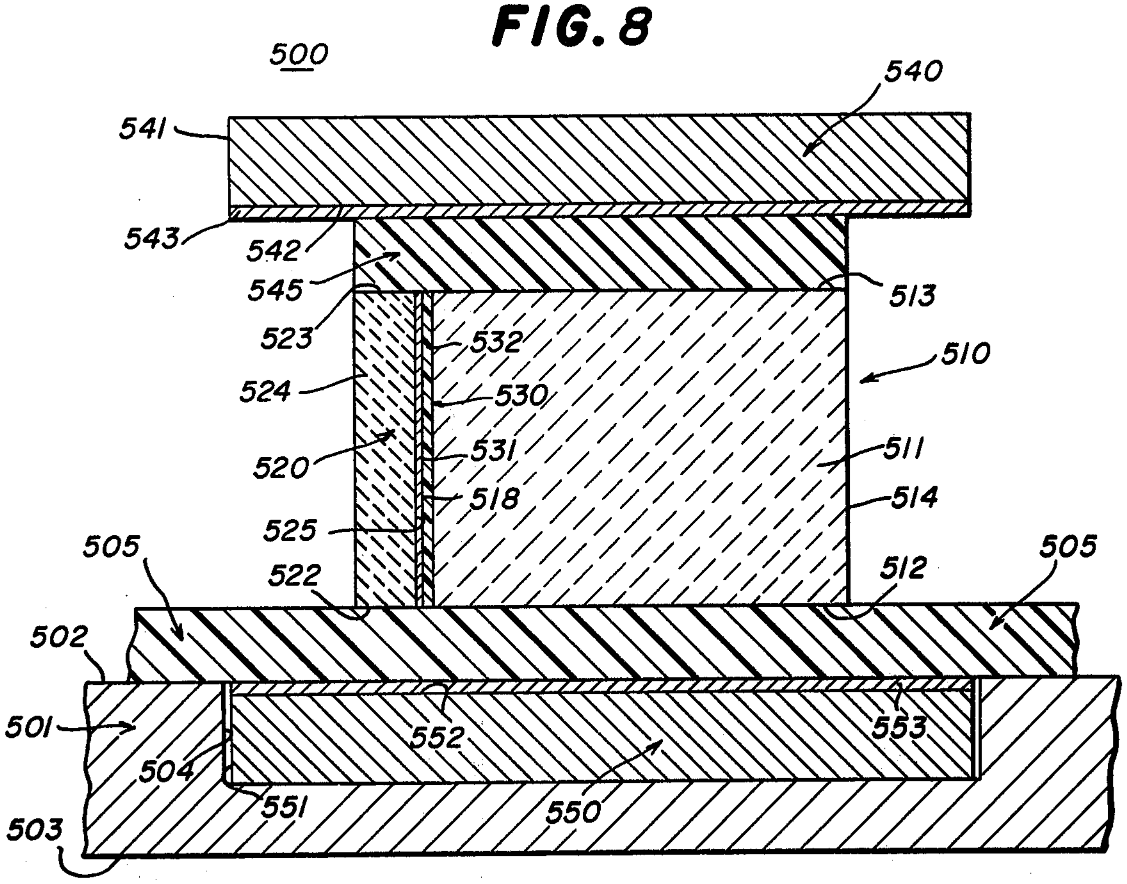
FIG. 8 is a further enlarged fragmentary view in vertical section through the ferrite isolator of FIG. 7 along the line 8—8 thereof.
Figure 9:
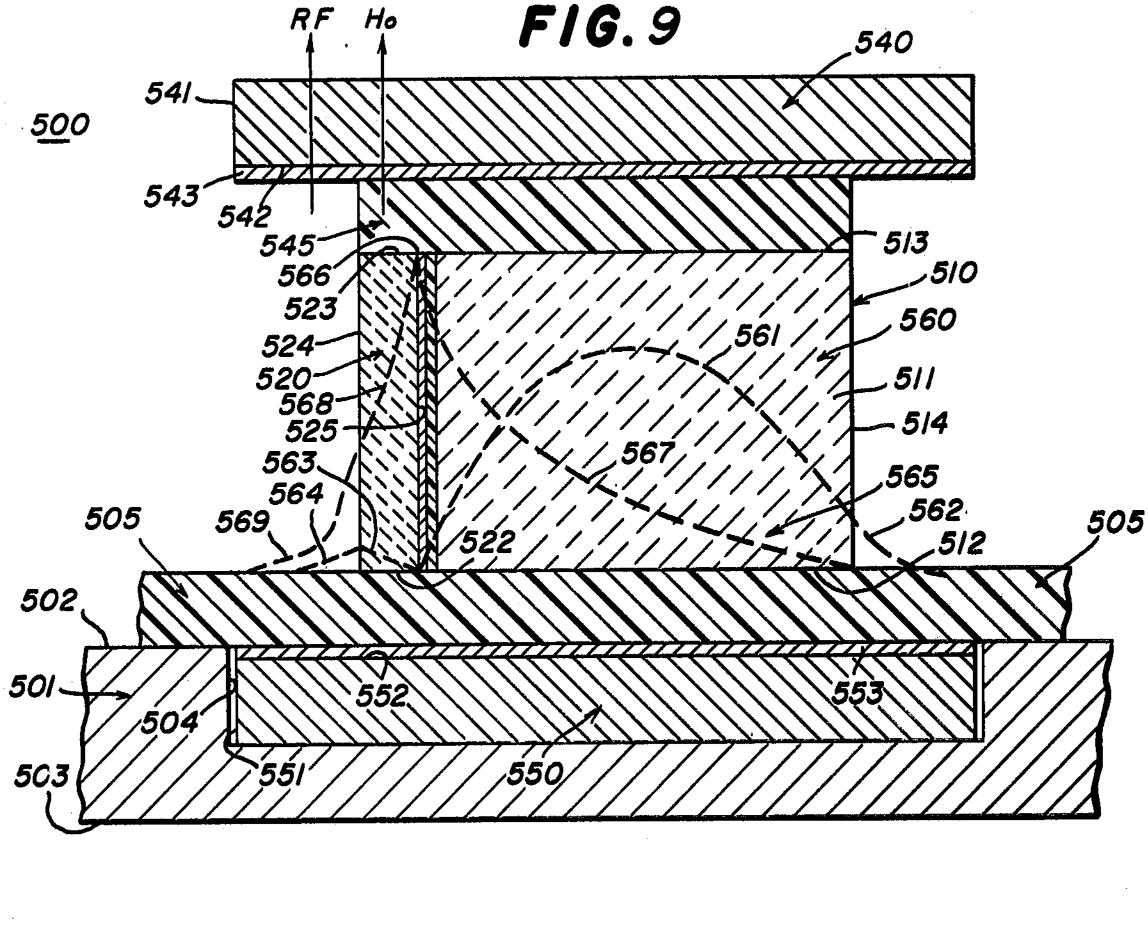
FIG. 9 is a view similar to FIG. 8 and illustrating the forward and reverse electric field distribution produced in the ferrite isolator.

There are illustrated in FIGS. 7 to 9 of the drawings the details of the construction and operation of the isolator 500 that is disposed between the mixer 65 and the local oscillator 70 in the transceiver 50 of FIG. 1. The isolator 500 is illustrated mounted upon a base plate 501 that is formed of metal, preferably aluminum, and has a top surface 502 and a bottom surface 503. Formed to the top surface 502 is a generally rectangular recess 504. Covering the top surface 502 of the base plate 501 is a plastic film 505 like the platic film 105 described above.

Mounted upon the base plate 501 and the film 505 is a dielectric waveguide 511 forming therewith an insular waveguide transmission line 510 and having the composition and properties of waveguide 111 described above. The dielectric waveguide 511 has a bottom 512 disposed upon the upper surface of the plastic film 505, a top 513, and a pair of parallel sides 514 and 515 interconnecting the bottom 512 and the top 513. Referring to FIG. 7, a rectangular recess 516 is provided along one side of the dielectric waveguide 511, the recess 516 having end surfaces 517 disposed essentially normal to the longitudinal axis of the dielectric waveguide 511 and normal to a side surface 518 thereof.

Disposed in the recess 516 is a ferrite slab 520 which is shaped and arranged to fit within the confines of the recess 516. As viewed in FIG. 8, the ferrite slab 520 is rectangular in cross section and includes a bottom 522 resting upon the upper surface of the plastic film 505 and a top 523, the bottom 522 and the top 523 being parallel to each other. Sides 524 and 525 are provided parallel to each other and normal to the bottom 522 and the top 523.

Disposed between the side 525 of the ferrite slab and the side surface 518 of the recess 516 is a resistance film 530 formed of a nichrome layer 531 carried by a plastic layer 532. The resistance film 530 covers the associated side surface 525 of the ferrite slab 520 and also serves mechanically to secure the transmission line 510 and the ferrite slab 520 to each other.

As illustrated, a first magnet member 540 is provided overlying the portion of the transmission line 510 having the ferrite slab 520 embedded therein (see FIG. 7), and a second magnet member 550 is provided in the recess 504 in the base plate 501 and underlying that portion of the transmission line 510 in which the ferrite slab 520 is embedded. The first magnet member 540 has an outer surface 541 that surrounds a pole face 542 disposed essentially parallel to the top 513 of the transmission line 510 and the top 523 of the ferrite slab 520. The pole face 542 is covered by a metal film 543, and the portion of the metal film 543 opposite the adjacent portions of the transmission line 510 of the ferrite slab 520 is covered by a plastic film 545 that is in contact with the transmission line top 513 and the ferrite slab top 523.

The second magnet member 550 has an outer surface 551 that fits within the recess 504 in the base plate 501 and surrounds a pole face 552 disposed toward the bottom 512 of the transmission line 510 and the bottom 522 of the ferrite slab 520. The pole face 552 is covered by a metal film 553, and the metal film 553 is in turn covered by the plastic film 505 described above.

The action of the ferrite isolator 500 will now be explained by reference to FIG. 9 of the drawings. If a signal having a frequency of for example 60 GHz is incident at an inlet port for the dielectric waveguie 511 disposed to the bottom in FIG. 7, with one polarity of the magnet members 540 and 550, the signal will travel through the dielectric waveguide 511 and past the ferrite slab 520 in the forward direction with little attenuation, but will be highly attenuated in the reverse direction. The forward wave (electric field distribution) is diagrammatically illustrated at 560 in FIG. 9 and has a maximum at 561 in the interior of the dielectric waveguide 511. The forward wave 560 has a portion 562 that lies outside of the waveguide 511, a portion 563 in the ferrite slab 520 and a portion 564 that lies to the left of the ferrite slab 520 as viewed in FIG. 9. The reverse wave is diagrammatically illustrated at 565 and has a maximum 566 at the resistance film 530. The reverse wave 565 has a portion 567 that decreases in value from the maximum 566 toward essentially zero value at the right hand edge of the waveguide 511 as viewed in FIG. 9. There also is a portion 568 of the reverse wave of 565 that is disposed in the ferrite slab 520 and decreases in value towards the outer surface 524 thereof and has a further portion 569 outside of the ferrite slab 520. The isolator 500 can be called a "fringe field isolator" because it uses the transverse fields extending out of the dielectric region for its operation. In effect, the resistance film 530 is invisible to the forward propagating wave 560, whereas the rearward propagating wave 565 has a maximum value at the resistance film interface. As a result, a high degree of power absorption takes place in the reverse direction of wave propagation and a very low decree of power absorption takes place in the forward direction of wave propagation. The amount of absorption in the resistance film 530 expressed in dB is proportional to the length of the ferrite slab 520. For operation at a frequency of 60 GHz the DC magnetic field required from the magnet members 540 and 550 is typically on the order of 2,000 to 3,000 oersteds. The thickness of the ferrite slab 520 and the value of the applied DC magnetic field from the magnet members 540 and 550 are adjusted so that the transverse electric field pattern has a null at the resistance film 530 for forward wave propagation, resulting in low loss propagation.

Referring now to FIG. 1, the use and operation of the isolator 500 in the transceiver 50 will be described. The isolator 500 is illustrated as connecting the local oscillator 70 to the mixer 65. The isolator 500 is essentially a unidirectional device which has very low attenuation in the forward direction as explained above and very high attenuation in the reverse direction. Only a small leakage signal is transmitted in the reverse direction, the ratio of reverse to forward attenuation (in dB) or figure of merit being a measure of the isolation provided. In the device illustrated, a minimum ratio of 10 dB is provided and isolation as high as 30 dB can be provided.

The ferrite isolator 500 in FIG. 1 is provided at the output of the local oscillator 70 so that any reflected signals from the mixer 65 (or other load) do not cause changes in the power output of the local oscillator 70 nor cause changes in the frequency of operation of the local oscillator 70.

In a constructional example of the ferrite isolator 500, the transmission line waveguide 511 is made of the material described above with respect to the transmission waveguide 111, and preferably has a thickness of 0.030 inch and an overall width of 0.040 inch. The ferrite slab 520 has a width as viewed in FIG. 8 of 0.010 inch, a length of 0.8 inch and a height of 0.30 inch, and fits within a like dimensioned recess 516 in the side of the waveguide 511.

The resistance film 530 may have a value of 75 ohms per square which would be useful at higher frequencies such as 60 GHz, while other resistance films having a value of 377 ohms per square would be useful at the lower frequencies such as 15 GHz. The magnet members 540 and 550 may be constructed of the materials described above with respect to the magnet members 160 and 170 and are provided with the same types of metal films 543 and 553 as the metal films 163 and 173 described above.

The height of the ferrite slab 520 may not be the same as that of the dielectric waveguide 511, but there are advantages gained by having the same height, namely simple geometry and low fabrication cost. The length of the ferrite slab 520 is governed by the acceptable level of total forward transmission loss, and also the feasible rate of transmission loss per guide wavelength. Preferably the length of the ferrite slab 520 is 2 to 3 free space wavelengths. A typical value of the reverse isolation provided by the ferrite slab 520 is 8 dB per inch at 10 GHz. This number increases approximately in proportion to the frequency. The thickness or width of the ferrite slab 520 is chosen to provide the widest possible operating range without developing higher order modes. The width of the ferrite slab 520 more particularly is related to the operating frequency range just as is the total guide dimension in order that single mode operation be preserved. The width of the ferrite slab 520 also is related to frequency as it affects the relative cross-sectional areas of the ferrite slab 520 and the dielectric waveguide 511. Preferably the width of the ferrite slab 520 is 10% to 30% of the total width of the isolator 500.

In a typical V-band device incorporating the isolator 500, the center frequency of operation was 61.25 GHz. The applied magnetic field was 4400 oersteds and the material of the ferrite slab 520 was the nickel-zinc ferrite described above. The isolator 500 gave isolation of 10 dB with an insertion loss of 1 dB and had a bandwidth of 250 MHz between 8-dB points. In a second typical device, namely, a Ku-band device operating at 14.5 GHz with dimensions approximately twice those described above with respect to the V-band device, the center frequency was 14.5 GHz, the magnetic field was 2000 oersteds, isolation was 11 to 18 dB, the insertion loss was 1.1 to 1.9 dB and the bandwidth was 5% between 10 dB points isolation and 1.8 dB isolation.

As illustrated in FIGs. 7 to 9, the ferrite slab 520 is embedded within the envelope of the dielectric waveguide 511. In another preferred form of the invention, the ferrite slab 520 is moved to the right as viewed in FIG. 9 and the alumina of the dielectric waveguide 511 is disposed also to the left of the ferrite slab 520. These two described configurations are beneficial because they change the normal field distribution (in the absence of a magnetic field) by a minimal amount because of the similarity between the dielectric properties of the alumina of the waveguide 511 and the ferrite of the slab 520. Such construction provide full waveguide bandwidths (typically 30% to 40% of the center of the band) through the isolator 500 which would not be the case if the ferrite slab 520 were simply attached to the outer surface of a dielectric waveguide of constant cross section, all as will be explained hereinafter with respect to FIGS. 14 and 15 of the drawings.

Figure 10:
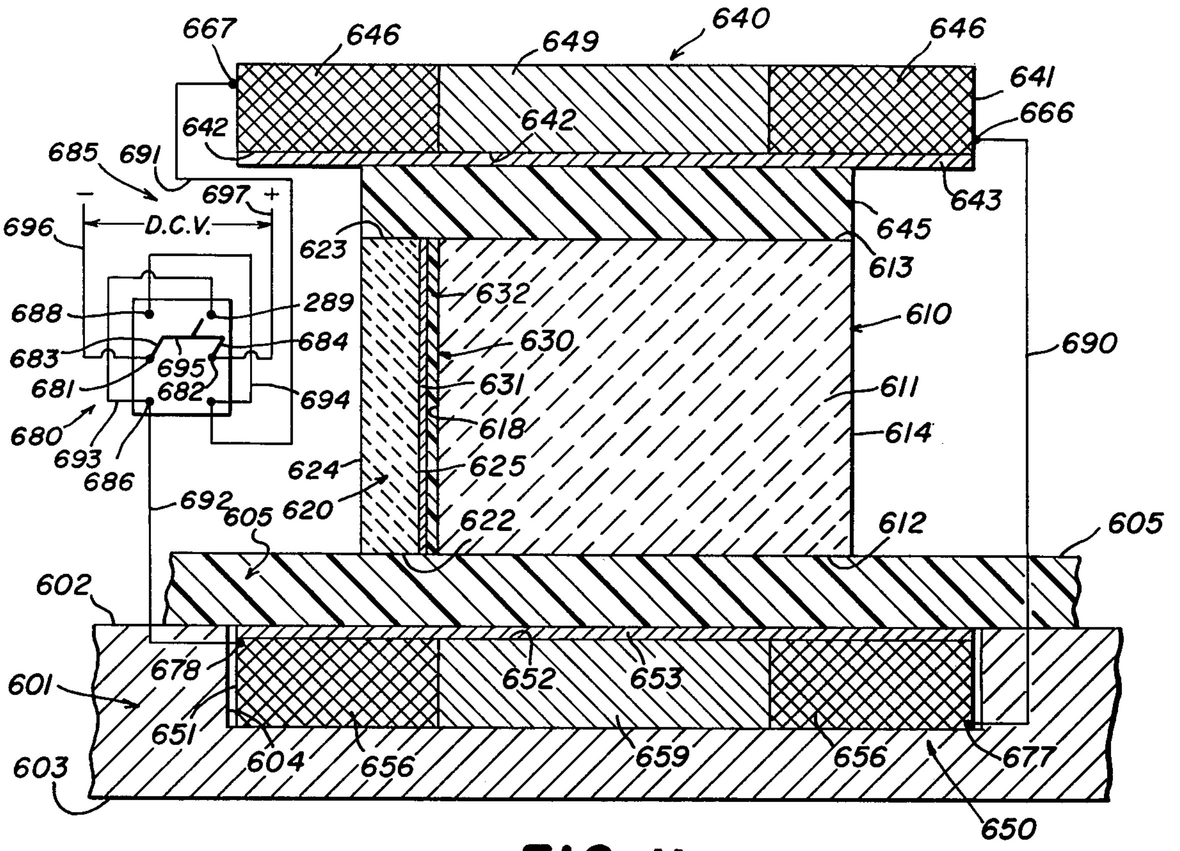
FIG. 10 is a view similar to FIG. 8 and illustrating a second preferred embodiment of a ferrite isolator made in accordance with the present invention, the ferrite isolator of FIG. 10 utilizing electromagnets in place of the permanent magnets of FIG. 8.

There is illustrated in FIG. 10 of the drawings a second preferred form of the ferrite isolator 600 made in accordance with and embodying the principles of the present invention. The ferrite isolator 600 is constructed similar to the ferrite isolator 500 of FIGS. 7 to 9, and accordingly, numbers in the 600 series have been applied to those parts in the ferrite isolator 600 that correspond to like numbered parts in the 500 series in the isolator 500 of FIGS. 7 to 9. The principal difference between the isolator 600 of FIG. 10 and the isolator 500 of FIGS. 7 to 9 is the substitution of electromagnets 640 and 650 for the permanent magnets 540 and 550 in the isolator 500. More specifically, the electromagnet 640 includes a magnet coil 646 having terminals 647 and 648, the magnet coil 646 being disposed about a magnetic core 649. The electromagnet 650 has a magnet coil 656 provided with terminals 657 and 658, the magnet coil 656 being disposed about a magnetic core 659. In order to reverse the direction of the magnetic field generated by the electromagnets 640 and 650, a reversing switch 680 has been provided constructed and arranged like the reversing switch 280 described above. Accordingly, the details of construction of the reversing switch 680 will not be further described.

Utilizing the reversing switch 680, the polarity of the DC current applied to the electromagnets 640 and 650 can be reversed, thus reversing the direction of the magnetic field produced by the electromagnets 640 and 650 and applied to the adjacent portion of the dielectric waveguide 611 and applied to the ferrite slab 620. If the reversing switch 680 is first placed in a position to create a magnetic field of the polarity illustrated in FIG. 9, then energy in the dielectric waveguide 611 is transmitted essentially unattenuated past the ferrite slab 620 in the forward direction, but is substantially attenuated and essentially blocked in the reverse direction. If the position of the reversing switch 680 is reversed, then the magnetic field generated by the electromagnets 640 and 650 will be reversed, and as a consequence the direction of isolation is reversed in the isolator 600.

Figure 11:
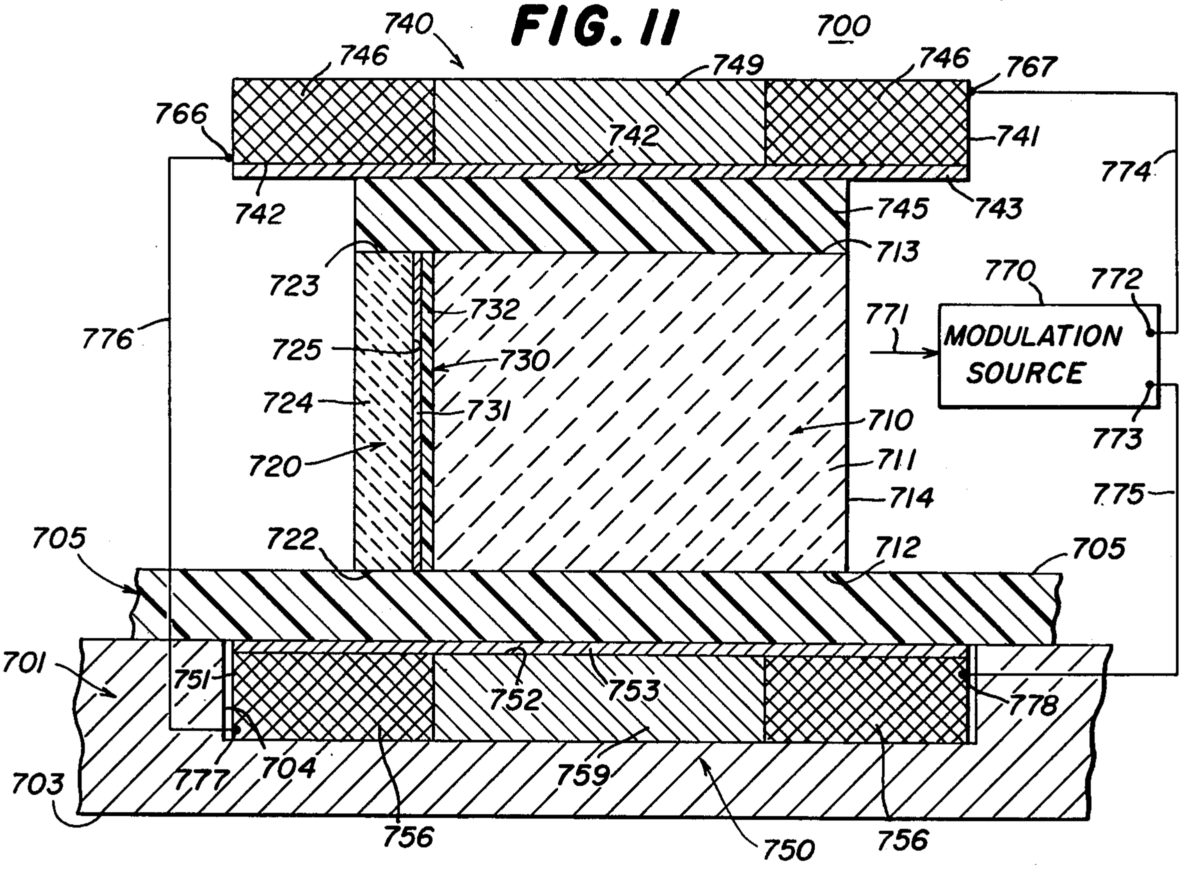
FIG. 11 is a view similar to FIG. 10 and showing a modulation source for the electromagnet of FIG. 10.
Figure 12:
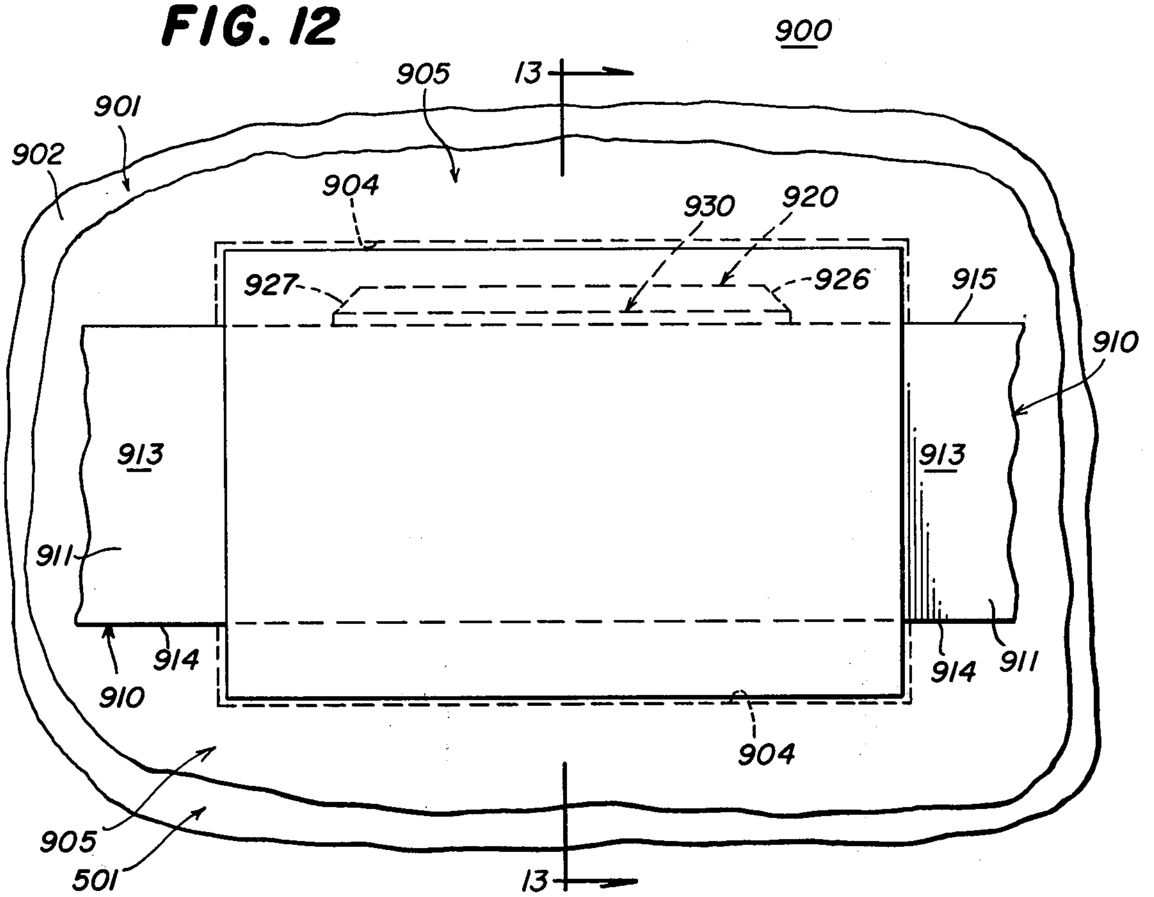
FIG. 12 is a fragmentary plan view similar to FIG. 8 and illustrating a first further preferred embodiment of a ferrite isolator made in accordance with and embodying the principles of the present invention.

Yet another preferred embodiment of an isolator 700 is illustrated in FIG. 12 of the drawings, wherein the reversing switch 680 in the isolator 600 has had substituted therefor a modulation source 770 having a modulation input 771 therefor, the output terminals 772 and 773 of the modulation source 770 being connected to the electromagnet coils 741 and 751 of the electromagnets 740 and 750, respectively. In all other respects, the construction of the isolator 700 of FIG. 11 is identical to that of the isolator 600 of FIG. 10. The isolator 700 of FIG. 11 serves to modulate the electromagnetic energy being transmitted by the dielectric waveguide 710 in accordance with the modulation signal applied at the modulation input 771. In one usage of the isolator 700 as a modulator, it would be inserted in the transmission line 56 of FIG. 1 and would provide amplitude modulation of the signal from the transmitter 55.

Figure 13:
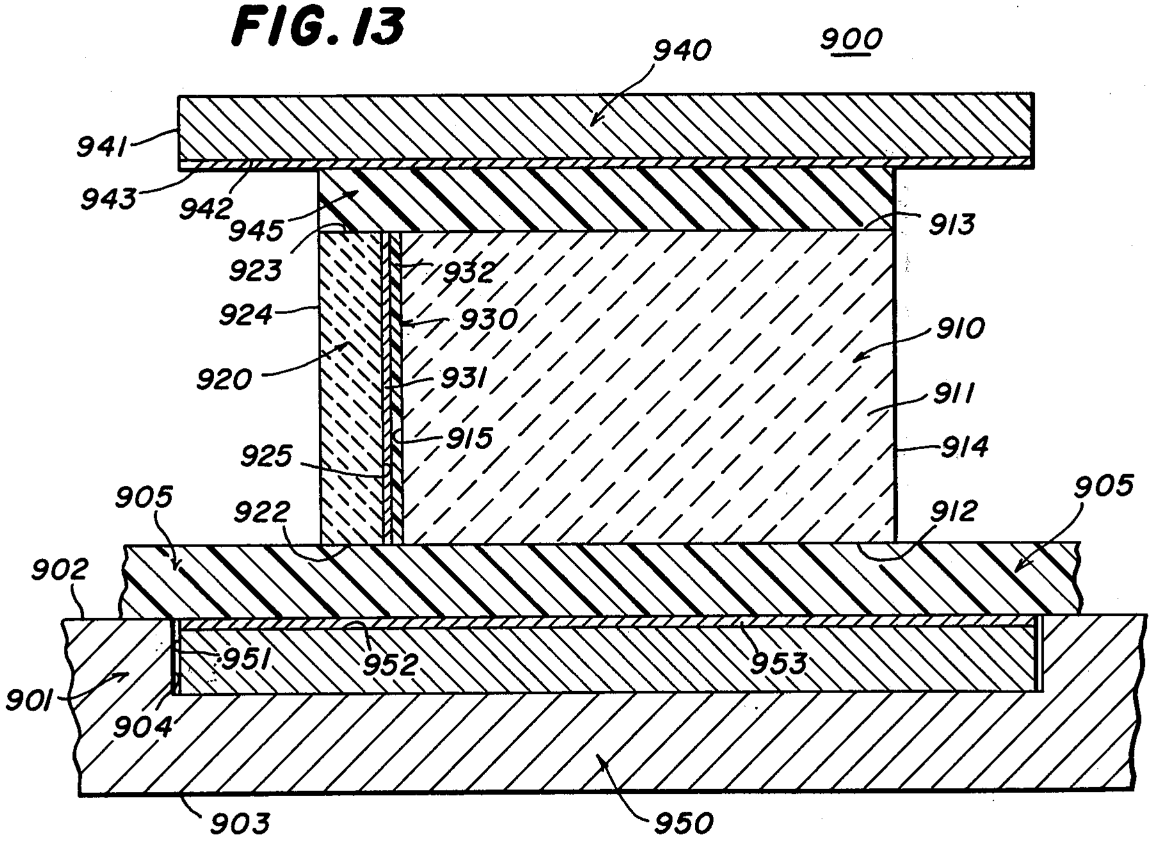
FIG. 13 is a further enlarged view of the ferrite isolator of FIG. 12 as seen in the direction of the arrows along the line 13—13 thereof.

There is illustrated in FIGS. 12 and 13 of the drawings a further preferred embodiment of an isolator 900 made in accordance with and embodying the principles of the present invention. The isolator 900 is similar in construction to the isolator 500 of FIGS. 7 to 9 of the drawings. Accordingly, numbers in the 900 series have been applied to those parts in FIGS. 12 and 13 which correspond to like numbered parts in the 500 series of the isolator 500 of FIGS. 7 to 9. The isolator 900 is more simple in construction than the isolator 500 in that the ferrite slab 920 therein is simply attached to one of the sides of the dielectric waveguide 911 which is of uniform cross section throughout the extent of the isolator 900 (see FIG. 12). More specifically, the ferrite slab 920 is secured to the side 915 of the waveguide 911 by the resistance film 930 thereof. The ends of the ferrite slab at 926 and 927 are also preferably tapered so as to provide a minimum mismatch in the area of the dielectric slab 920.

The isolator 900 works essentially like the isolator 500 described above. One of the fundamental differences resides in the fact that the useful bandwidth for the isolator 900 is only approximately one-third of that of the isolator 500. This results from the increase in width of the effective waveguide in the area of the isolator 900, which increased width lowers the cutoff frequency of the higher order modes and therefore reduces the bandwidth for single mode operation.

Figure 14:
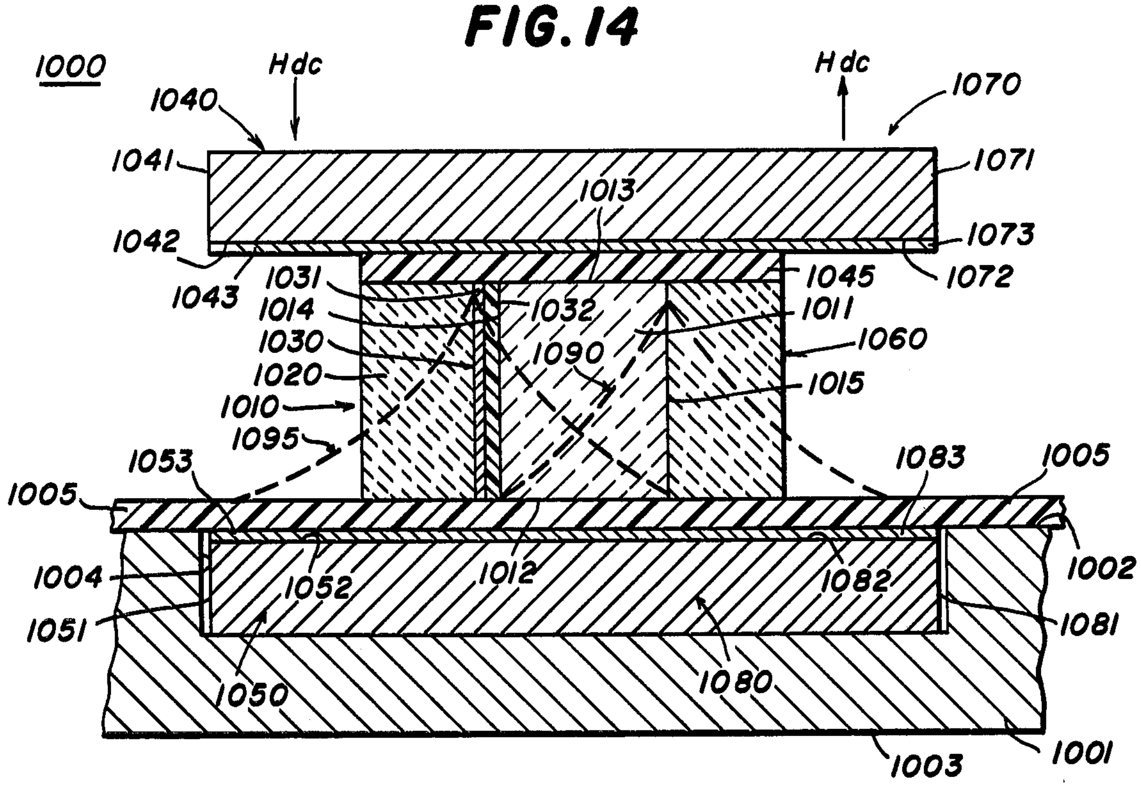
FIG. 14 is an enlarged view in vertical section similar to FIG. 8 and illustrating a still further preferred embodiment of a ferrite isolator made in accordance with and embodying the principles of the present invention.

Referring to FIG. 14 of the drawings, a further preferred embodiment of an isolator 1000 has been illustrated, the isolator 1000 also being made in accordance with and embodying the principles of the present invention. The isolator 1000 is similar in construction to the isolator 500 of FIGS. 7 to 9 of the drawings. Accordingly, numbers in the 1000 series have been applied to those parts in the isolator 1000 of FIG. 14 which correspond to like numbered parts in the 500 series of the isolator 500 of FIGS. 7 to 9. The isolator 1000 utilizes two ferrite slabs 1020 and 1060 which are disposed adjacent to the opposite sides 1014 and 1015, respectively, of a dielectric waveguide 1011, and more particularly are disposed in recesses in the sides thereof. Disposed between the waveguide 1011 and the ferrite slab 1020 is a resistance film 1030 including a lossy nichrome layer 1031 and a plastic layer 1032. The adjacent sides of the dielectric waveguide 1011 and the ferrite slab 1060 are disposed against one another.

A first set of magnet members 1040 and 1050 is provided in cooperation with the first ferrite slab 1020, the magnet members 1040 and 1050 serving to establish a magnetic field through the ferrite slab 1020 of a first polarity as indicated diagrammatically by the arrow for the magnetic field therefrom. A second pair of magnet members 1070 and 1080 is provided for the ferrite slab 1060, the magnets 1070 and 1080 serving to establish a magnetic field of the polarity opposite that established by the magnet members 1040 and 1050, the polarity of the magnetic field produced by the magnet members 1070 and 1080 being diagrammatically illustrated by the associated arrow in FIG. 14. It will be appreciated that the magnet member 1070 is constructed like the magnet member 1040 and that the magnet member 1080 is constructed like the magnet member 1050, except for the opposite polarity thereof, whereby like numbers have been applied to like parts in the respective number series.

The forward wave field distribution in the dielectric waveguide 1011 and the ferrite slab 1060 is illustrated by the numeral 1090. It will be seen that the forward wave 1090 has a maximum value at the interface between the dielectric waveguide 1011 and the ferrite slab 1060, and then decreases to essentially zero value in both directions from the peak value. The reverse wave is designated by the numeral 1095 and it will be seen that the reverse wave 1095 peaks at the resistance film 1030 and falls to zero value from the maximum value. The resistance film 1030 has no effect on the forward propagating wave 1090, whereby the forward propagating wave 1090 proceeds along the waveguide 1011 with essentially no attenuation past the ferrite slabs 1050 and 1060. On the other hand, the rearward or reverse propagating wave 1095 has a maximum value at the resistance film 1030. As a result, a high degree of power absorption takes place in the reverse direction of wave propagation, whereby substantially to attenuate the reverse wave 1095. The amount of absorption in the resistance film 1030 expressed in dB is proportional to the length of the ferrite slabs 1020 and 1060. For operation at a frequency of 60 GHz, the DC magnetic field required from the magnet member pairs 1040-1050 and 1070-1080 is typically in the order of 2000 to 3000 oersteds. The thicknesses of the ferrite slabs 1020 and 1060 and the value of the DC magnetic fields from the magnet members are adjusted so that the transverse electric field pattern of the forward wave 1090 has essentially a null at the resistance film 1030, resulting in low loss propagation. The isolator 1000 of FIG. 16 has substantially reduced forward insertion loss as compared to the isolator 500 of FIGS. 7 to 9.

The isolator 1000 of FIG. 14 has been illustrated as being constructed as part of an insular waveguide system with a thin plastic film 1045 disposed between the upper magnet members 1040-1070 and the parts disposed immediately therebelow. It will be appreciated that in an alternative construction, the plastic film 1045 may be omitted, whereby to provide an isolator useful in an image waveguide system. Likewise, the plastic film 1045 may be omitted while still retaining the major portion of the advantages of the isolator 1000. The magnet members 1040, 1050, 1070 and 1080 may also be electromagnets instead of the permanent magnets illustrated. Instead of being disposed in recesses that extend to the outer sides of the waveguide 1011, the ferrite slabs 1020 and 1060 may be in the recesses spaced inwardly from the outer sides or may be secured to a flat outer side of the waveguide 1011 as in FIGS. 12 and 13.

Figure 15:
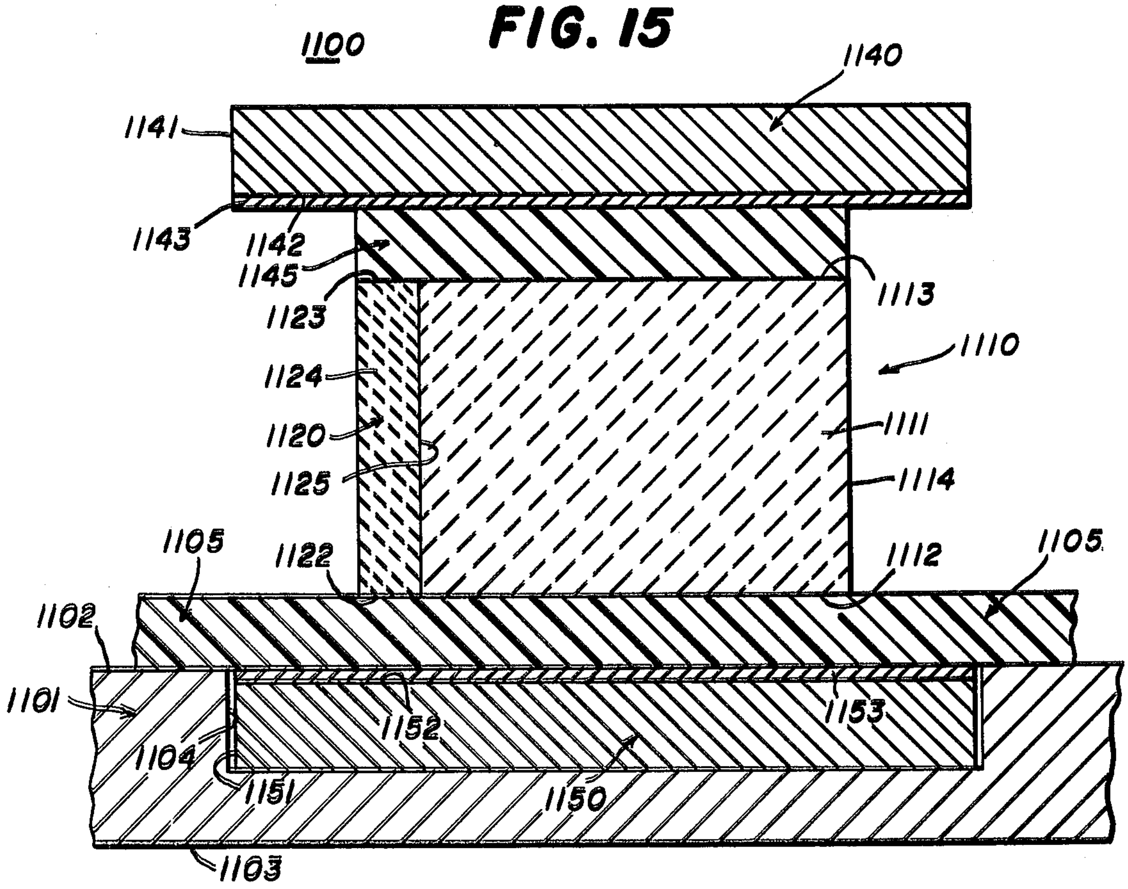
FIG. 15 is a view similar to FIG. 8 but illustrating a ferrite phase shifter made in accordance with and embodying the principles of the the present invention.

Referring to FIG. 15 of the drawings, there is illustrated a phase shifter 1100 made in accordance with and embodying the principles of the present invention. The phase shifter 1100 is constructed essentially identical to the isolator 500 of FIGS. 7 to 9, whereby reference numerals in the 1100 series have been applied to those parts in FIG. 15 that correspond to like numbered parts in the 500 series of the isolator 500 in FIGS. 7 to 9. The difference between the phase shifter 1100 of FIGS. 15 and the isolator 500 of FIGS. 7 to 9 resides in the omission of the resistance film 530. The resultant structure serves as a phase shifter, i.e., the phase of the electromagnetic energy conducted along the waveguide 1110 is shifted as it passes the ferrite slab 1120. The amount of phase shifting achieved is a function of the strength of the magnetic field created by the magnet members 1140 and 1150, and also the function of the length of the ferrite slab 1120. In order to achieve a 180° phase shift, the magnetic field produced by the magnets 1140 and 1150 is 2000–3000 oersteds, and the length of the ferrite slab 1120 is 0.5 inch at 60 GHz, for example.

The phase shifter 1100 of FIG. 15 has been illustrated as incorporated in an insular waveguide system, and also illustrates the use of a thin film 1145 between the upper magnet member 1140 and the underlying part. If it is desired to incorporate the phase shifter in an image waveguide system, then the plastic film 1105 is omitted. It also is possible to omit the thin plastic film 1145, while still retaining the major portion of the advantages of the phase shifter 1100 of FIG. 15. It further will be appreciated that electromagnets may be utilized in place of the permanent magnets illustrated to achieve an electrically variable phase shifter. Instead of being disposed in a recess that extends to the adjacent outer side of the waveguide 1111, the ferrite slab 1120 may be in a recess spaced inwardly from the adjacent outer side or may be secured to a flat outer side of the waveguide 1111 as in FIG. 12 and 13.

While there have been described what are at present considered to be the preferred embodiments of the invention, it will be understood that various modifications may be made therein, and it is intended to cover in the appended claims all such modifications that fall within the true spirit and scope of the invention.

What is claimed is:

1. A circulator for use in the frequency range from about 1 GHz to about 1,000 GHz comprising a conductive image plane, three elongated high permittivity dielectric waveguides of finite cross section adjacent to said conductive image plane, a thin film of synthetic organic plastic resin disposed between and secured to both said image plane and said waveguides, said thin film being low loss in character having a low permittivity compared with that of said dielectric waveguide, the ratio between the thickness of said thin film and the square root of the cross-sectional area of said dielectric waveguides being in the range from about 0.02 to about 1.0, said waveguides being arranged in an equiangular Y-shape and integrally connected at a common junction and each including a port, a ferrite cylinder in said waveguide junction and having the axis of said ferrite cylinder disposed essentially normal to said image plane, and means for establishing a magnetic field in said ferrite cylinder extending essentially normal to said image plane, whereby microwave energy in said frequency range inserted in a first port is essentially all transmitted with little attenuation to a second part and essentially none transmitted to the third port.

2. The circulator set forth in claim 1, wherein said conductive plane is a metal plate.

3. The circulator set forth in claim 1, wherein the permittivity of said dielectric waveguide is at least four.

4. The circulator set forth in claim 1, wherein said dielectric waveguides have a loss tangent less than 0.001.

5. The circulator set forth in claim 1, wherein said dielectric waveguides are formed of ceramic.

6. The circulator set forth in claim 1, wherein said dielectric waveguides are rectangular in cross section, and the ratio between the width of said dielectric waveguides and thickness thereof is in the range from about 0.5 to 2.0.

7. The circulator set forth in claim 1, wherein said ferrite cylinder is circular in cross section and is spaced from the adjacent sides of said waveguides a distance at least equal to one-fourth the width of one of said waveguides.

8. The circulator set forth in claim 1, wherein said means for establishing a magnetic field is a permanent magnet.

9. The circulator set forth in claim 1, wherein said means for establishing a magnetic field is an electromagnet.

10. A circulator for use in the frequency range from about 1 GHz to about 1,000 GHz comprising a conductive image plane, three elongated high permittivity dielectric waveguides of finite cross section adjacent to said conductive image plane, a thin film of synthetic organic plastic resin disposed between and secured to both said image plane and said waveguides, said waveguides being arranged in an equiangular Y-shape and integrally connected at a common junction and each including a port, a ferrite cylinder in said waveguide junction and having the axis of said ferrite cylinder disposed essentially normal to said image plane, a first magnetic pole member having a first pole face adjacent to the end of said ferrite cylinder disposed toward said image plane and a second magnetic pole member having a second pole face adjacent to the other end of said ferrite cylinder, and thin films of synthetic organic plastic resin respectively disposed between said pole faces and the adjacent surfaces of said ferrite cylinder and said waveguides, said thin films being low loss in character and having a low permittivity compared with that of said waveguides, the ratio between the thicknesses of said thin films and the square root of the cross-sectional area of said dielectric waveguides being in the range from about 0.02 to about 1.0, said pole members cooperating to establish a magnetic field in said ferrite cylinder extending normal to said image plane whereby microwave energy in said frequency range inserted in a first port is essentially all transmitted with little attenuation to a second port and essentially none transmitted to the third port.

11. The circulator set forth in claim 10, wherein said thin films have a permittivity less than about 3.

12. The circulator set forth in claim 10, wherein said thin films have a loss tangent less than about 0.001.

13. The circulator set forth in claim 10, wherein the synthetic organic resin in said thin films is a polyethylene resin.

14. The circulator set forth in claim 10, wherein the ratio between the permittivity of said dielectric waveguides and the permittivity of said thin films is at least 2.0:1 to provide good guidability.

15. The circulator set forth in claim 10, wherein said thin films are heat sealed to said image plane and said dielectric waveguide.

16. A switch for use in the frequency range from about 1 GHz to about 1,000 GHz comprising a conductive image plane, three elongated high permittivity dielectric waveguides of finite cross section adjacent to said conductive image plane, a thin film of synthetic organic plastic resin disposed between and secured to both said image plane and said waveguides, said thin film being low loss in character having a low permittivity compared with that of said dielectric waveguide, the ratio between the thickness of said thin film and the square root of the cross-sectional area of said dielectric waveguides being in the range from about 0.02 to about 1.0, said waveguides being arranged in an equiangular Y-shaped and integrally connected at a common junction and each including a port, a ferrite cylinder in said waveguide junction and having the axis of said ferrite cylinder disposed essentially normal to said image plane, and means for establishing a magnetic field in said ferrite cylinder extending essentially normal to said image plane of a first polarity and alternatively of a second polarity opposite in sense to said first polarity, microwave energy in said frequency range inserted in the first port when the magnetic field is of the first polarity being essentially all transmitted with little attenuation to the second port and essentially none transmitted to the third port, microwave energy in said freqeuncy range inserted in said first port when the magnetic field is of the second polarity being essentially all transmitted with little attenuation to said third port and essentially none transmitted to said second port, whereby reversing the polarity of the magnetic field through said ferrite cylinder switches transmission of the microwave energy between said second and third ports.

17. The switch set forth in claim 16, wherein said means for establishing a magnetic field is an electromagnet and a switch for reversing the polarity of said electromagnet.

18. A switch for use in the frequency range from about 1 GHz to about 1,000 GHz comprising a conductive image plane, three elongated high permittivity dielectric waveguides of finite cross section adjacent to said conductive image plane, a thin film of synthetic organic plastic resin disposed between and secured to both said image plane and said waveguides, said waveguides being arranged in an equiangular Y-shape and integrally connected at a common junction and each including a port, a ferrite cylinder in said waveguide junction and having the axis of said ferrite cylinder disposed essentially normal to said image plane, a first magnetic pole member having a first pole face adjacent to the end of said ferrite cylinder disposed toward said image plane and a second magnetic pole member having a second pole face adjacent to the other end of said ferrite cylinder, and thin films of synthetic organic plastic resin respectively disposed between said pole faces and the adjacent surfaces of said ferrite cylinder and said waveguides, said thin films being low loss in character and having a low permittivity compared with that of said waveguides, the ratio between the thicknesses of said thin films and the square root of the cross-sectional area of said dielectric waveguides being in the range from about 0.02 to about 1.0, said pole members cooperating to establish a magnetic field in said ferrite cylinder extending essentially normal to said image plane of a first polarity and alternatively of a second polarity opposite in sense to said first polarity, microwave energy in said frequency range inserted in the first port when the magnetic field is of the first polarity being essentially all transmitted with little attenuation to the second port and essentially none transmitted to the third port, microwave energy in said frequency range inserted in said first port when the magnetic field is of the second polarity being essentially all transmitted with little attenuation to said third port and essentially none transmitted to said second port, whereby reversing the polarity of the magnetic field through said ferrite cylinder switches transmission of the microwave energy between said second and third ports.

19. The switch set forth in claim 18, wherein said thin films are heat sealed to said image plane and said dielectric waveguide.

20. An isolator for use in the frequency range from about 1 GHz to about 1,000 GHz comprising a conductive image plane, an elongated high permittivity dielectric waveguide of finite cross section adjacent to said conductive image plane, a thin film of synthetic organic plastic resin disposed between and secured to both said image plane and said waveguides, said thin film being low loss in character having a low permittivity compared with that of said dielectric waveguide, the ratio between the thickness of said thin film and the square root of the cross-sectional area of said dielectric waveguides being in the range from about 0.02 to about 1.0, a ferrite slab adjacent to one side of said waveguide extending longitudinally for a predetermined length therealong, a resistance film disposed adjacent to said ferrite slab, and means for establishing a magnetic field in said ferrite slab extending substantially normal to said image plane, whereby microwave energy in said frequency range is transmitted through said waveguide past said ferrite slab with little attenuation in a forward direction and with high attenuation in the reverse direction.

21. The isolator set forth in claim 20, wherein said ferrite slab has a height essentially equal to that of said waveguide in a direction normal to said image plane for said predetermined length.

22. The isolator set forth in claim 20, wherein said predetermined length is 2 to 3 free space wavelengths.

23. The isolator set forth in claim 20, wherein said waveguide is rectangular in cross section and said ferrite slab is rectangular in cross section and has a height essentially equal to that of said waveguide in a direction normal to said image plane for said predetermined length.

24. The isolator set forth in claim 20, wherein said ferrite slab has a width in a direction parallel to said image plane and normal to the longitudinal axis of said waveguide of 10% to 30% of total width of the isolator.

25. The isolator set forth in claim 20, wherein said resistance film is formed of nichrome.

26. The isolator set forth in claim 20, wherein said resistance film covers the interface between said ferrite slab and said dielectric waveguide.

27. An isolator for use in the frequency range from about 1 GHz to about 1,000 GHz comprising a conductive image plane, an elongated high permittivity dielectric waveguide of finite cross section adjacent to said conductive image plane, a thin film of synthetic organic plastic resin disposed between and secured to both said image plane and said waveguide, the ratio between the thickness of said thin film and the square root of the cross-sectional area of said dielectric waveguide being in the range from about 0.02 to about 1.0, said thin film being low loss in character and having a low permittivity compared with that of said waveguide, a ferrite slab adjacent to one side of said waveguide extending longitudinally for a predetermined length therealong, a resistance film disposed adajcent to said ferrite slab, a first magnetic pole member having a first pole face adjacent to the surface of said waveguide disposed toward said image plane and a second magnetic pole member having a second pole face adjacent to the surface of said waveguide disposed away from said image plane, thin films of said synthetic organic plastic resin respectively disposed between said pole faces and the adjacent surfaces of said waveguide, said pole members being in general registry with said ferrite slab and cooperating to establish a magnetic field in said ferrite slab extending substantially normal to said image plane, whereby microwave energy in said frequency range is transmitted through said waveguide past said ferrite slab with little attenuation in a forward direction and with high attenaution in the reverse direction.

28. The isolator set forth in claim 27, wherein said thin films are heat sealed to said image plane and said dielectric waveguide.

29. An isolator for use in the frequency range from about 1 GHz to about 1,000 GHz comprising a conductive image plane, an elongated high permittivity dielectric waveguide of finite cross section adjacent to said conductive image plane and having a recess therein adjacent to one side thereof, a thin film of synthetic organic plastic resin disposed between and secured to both said image plane and said waveguides, said thin film being low loss in character having a low permittivity compared with that of said dielectric waveguide, the ratio between the thickness of said thin film and the square root of the cross-sectional area of said dielectric waveguides being in the range from about 0.02 to about 1.0, a ferrite slab in said recess in said waveguide and extending longitudinally for a predetermined length therealong, a resistance film disposed adjacent to said waveguide and said ferrite slab, and means for establishing a magnetic field in said ferrite slab extending substantially normal to said image plane, whereby microwave energy in said frequency rang is transmitted through said waveguide past said ferrite slab with little attenuation in a forward direction and is transmitted with high attenuation in the reverse direction.

30. The isolater set forth in claim 29, wherein said ferrite slab is entirely embedded in and confined within the envelope of said dielectric waveguide.

31. The isolator set forth in claim 29, wherein said recess is in one of the longitudinal sides of said dielectric waveguide, and said ferrite slab is disposed in said recess.

32. The isolator set forth in claim 29, wherein said recess has a width of from about 10% to about 30% of the total width of said isolator in a direction parallel to said image plane, and said ferrite slab has a width no greater than the width of said recess in a direction parallel to said image plane.

33. The isolator set forth in claim 29, wherein said predetermined length 2 to 3 free space wavelengths.

34. An isolator for use in the frequency range from about 1 GHz to about 1,000 GHz comprising a conductive image plane, an elongated high permittivity dielectric waveguide of finite cross section adjacent to said conductive image plane and including a length of uniform cross section, a thin film of synthetic organic plastic resin disposed between and secured to both said image plane and said waveguides, said thin film being low loss in character having a low permittivity compared with that of said dielectric waveguide, the ratio between the thickness of said thin film and the square root of the croos-sectional area of said dielectric waveguides being in the range from about 0.02 to about 1.0, a ferrite slab secured to one side of said waveguide in said length of uniform cross section and extending longitudinally for a predetermined length therealong, a resistance film disposed adjacent to said waveguide and said ferrite slab, and means for establishing a magnetic field in said ferrite slab extending substantially normal to said image plane, whereby microwave energy in said frequency range is transmitted through said waveguide past said ferrite slab with little attenuation in a forward direction and is transmitted with high attenuation in the reverse direction.

35. The isolator set forth in claim 34, wherein said ferrite slab has a width in a direction parallel to said image plane of 10% to 30% of the total width of said isolator.

36. The isolator set forth in claim 34, wherein said predetermined length is 2 to 3 space wavelengths.

37. A switch for use in the frequency range from about 1 GHz to about 1,000 GHz comprising a conductive image plane, an elongated high permittivity dielectric waveguide of finite cross section adjacent to said conductive image plane, a thin film of synthetic organic plastic resin disposed between and secured to both said image plane and said waveguides, said thin film being low loss in character having a low permittivity compared with that of said dielectric waveguide, the ratio between the thickness of said thin film and the square root of the cross-sectional area of said dielectric waveguides being in the range from about 0.02 to about 1.0, a ferrite slab adjacent to one side of said waveguide extending longitudinally for a predetermined length therealong, a resistance film disposed adjacent to said ferrite slab, and means for establishing a magnetic field in said ferrite slab extending substantially normal to said image plane of a first polarity and alternatively of a second polarity opposite in sense to said first polarity, microwave energy in said frequency range inserted in said waveguide when the magnetic field is of the first polarity being essentially all transmitted through said waveguide past said ferrite slab with little attenuation in a first direction and with high attenuation in the reverse direction, microwave energy in said frequency range inserted in said waveguide when the magnetic field is of the second polarity being essentially all transmitted through said waveguide past said ferrite slab with little attenuation in a second direction opposite to said first direction and with high attenuation in the reverse direction, whereby reversing the direction of the magnetic field through said ferrite slab switches the direction of transmission with little attenuation of the microwave energy through said waveguide past said ferrite slab.

38. The switch set forth in claim 37, wherein said means for establishing a magnetic field is an electromagnet and a switch for reversing the polarity of said electromagnet.

39. A modulator for use in the frequency range from about 1 GHz to about 1,000 GHz comprising a conductive image plane, an elongated high permittivity dielectric waveguide of finite cross section adjacent to said conductive image plane, a thin film of synthetic organic plastic resin disposed between and secured to both said image plane and said waveguides, said thin film being low loss in character having a low permittivity compared with that of said dielectric waveguide, the ratio between the thickness of said thin film and the square root of the cross-sectional area of said dielectric waveguides being in the range from about 0.02 to about 1.0, a ferrite slab adjacent to one side of said waveguide extending longitudinally for a predetermined length therealong, a resistance film disposed adjacent to said ferrite slab, means for establishing a magnetic field in said ferrite slab extending substantially normal to said image plane of a first polarity and alternatively of a second polarity opposite in sense to said first polarity, microwave energy in said frequency range inserted in said waveguide when the magnetic field is of the first polarity being essentially all transmitted through said waveguide past said ferrite slab with little attenuation in a first direction and with high attenuation in the reverse direction, microwave energy in said frequency range inserted in said waveguide when the magnetic field is of the second polarity being essentially all transmitted through said waveguide past said ferrite slat with little attenuation in a second direction opposite to said first direction and with high attenuation in the reverse direction, and means for varying the polarity and magnitude of said magnetic field in said ferrite slab thereby to modulate the amplitude of the microwave energy transmitted through said waveguide past said ferrite slab.

40. An isolator for use in the frequency range of from about 1 GHz to about 1,000 GHZ comprising a conductive image plane, an elongated high permittivity dielectric waveguide of finite cross section adjacent to said conductive image plane, a thin film of synthetic organic plastic resin disposed between and secured to both said image plane and said waveguides, said thin film being low loss in character having a low permittivity compared with that of said dielectric waveguide, the ratio between the thickness of said thin film and the square root of the cross-sectional area of said dielectric waveguides being in the range from about 0.02 to about 1.0, a first ferrite slab adjacent to one side of said waveguide extending longitudinally for a predetermined length therealong, first means for establishing a magnetic field in said first ferrite slab extending substantially normal to said image plane, a second ferrite slab adjacent to the other side of said waveguide and in transverse alignment with said first ferrite slab and extending longitudinally for a predetermined length therealong, a resistance film disposed adjacent to said second ferrite slab, and second means for establishing a magnetic field in said second ferrite slab extending substantially normal to said image plane and of the opposite polarity to the magnetic field established by said first means, whereby microwave energy in said frequency range is transmitted through said waveguide past said ferrite slabs with little attenuation in a forward direction and with high attenuation in the reverse direction.

41. The isolator set forth in claim 40, wherein said ferrite slabs are disposed in recesses in said dielectric waveguide.

42. The isolator set forth in claim 40, wherein said waveguide in the area of said ferrite slab is of uniform cross section, and said ferrite slabs are secured to the opposed sides of said waveguide in said length of uniform cross section.

43. A transceiver for use in the frequency range from about 1 GHz to about 1,000 GHz comprising a common antenna for both transmitting and receiving, a transmitter for generating electromagnetic energy in the frequency range from about 1 GHz to about 1,000 GHz; a local oscillator operating at a frequency different from that of said transmitter by an amount appropriate to provide a suitable I.F. frequency as a difference therebetween; a mixer for mixing the signal received from said antenna and the signal from said local oscillator to provide a suitable I.F. frequency; a circulator including a first conductive image plane, three elongated high permittivity dielectric waveguides of finite cross section adjacent to said first conductive image plane, a thin film of synthetic organic plastic resin disposed between and secured to both said image plane and said waveguides, said thin film being low loss in character having a low permittivity compared with that of said dielectric waveguide, the ratio between the thickness of said thin film and the square root of the cross-sectional area of said dielectric waveguides being in the range from about 0.02 to about 1.0, said waveguides being arranged in an equiangular Y-shape and integrally connected at a common junction and each including a port, a ferrite cylinder in said waveguide junction and having the axis of said ferrite cylinder disposed essentially normal to said first image plane, and first means for establishing a magnetic field in said ferrite cylinder extending essentially normal to said first image plane, the port of said first waveguide being connected to said antenna and the port of said second waveguide being connected to said mixer. and the port of said third waveguide being connected to said transmitter, whereby microwave energy in said frequency range inserted in said first port from said antenna is essentially all transmitted with little attenuation to said mixer via said second port and essentially none transmitted to said transmitter via said third port, and whereby microwave energy from said transmitter via said third port is essentially all transmitted with little attenuation to said antenna via said first port and essentially none transmitted to said mixer via said second port; and an isolator including a second conductive image plane, a fourth elongated high permittivity dielectric waveguide of finite cross section adjacent to said second conductive image plane, a ferrite slab adjacent to one side of said fourth waveguide extending longitudinally for a predetermined length therealong and being disposed essentially normal to said image plane, a resistance film disposed adjacent to said ferrite slab, and second means for establishing a magnetic field in said fourth waveguide and said ferrite slab extending essentially normal to said second image plane, and connections between one end of said fourth waveguide and said local oscillator and between the other end of said fourth waveguide and said mixer, whereby microwave energy in said frequency range is transmitted from said local oscillator through said waveguide past said ferrite slab to said mixer with little attenuation, and whereby microwave energy from said mixer transmitted toward said isolator is transmitted through said isolator with high attenuation thereby to protect with said local oscillator.

* * * * *

UNITED STATES PATENT AND TRADEMARK OFFICE

CERTIFICATE OF CORRECTION

PATENT NO. : 4,034,377

DATED : July 5, 1977

INVENTOR(S) : Robert M. Knox and Peter P. Toulios

It is certified that error appears in the above-identified patent and that said Letters Patent are hereby corrected as shown below:

[73] "Epsilon Lambda Electronics Corporation" should be --Epsilon Lambda Electronics Corp.--.
Column 4, line 13, "te" should be --the--;
line 54, "0.005" should be --0.0005--;
line 63, "0.0005" should be --0.00005--.
Column 5, line 67, "the" should be --of--.
Column 6, line 7, after "wavelength" insert --is--.
Column 8, line 9, "circular" should be --circulator--.
Column 10, line 18, "magnetic" should be --magnet--;
line 21, "magnetic" should be --magnet--;
line 25, "magnetic" should be --magnet--;
line 37, "electromagnetic" should be --electromagnet--.
Column 11, line 6, "255" should be --225--;
line 8, "switches" should be --switch--;
line 29, "platic" should be --plastic--.
Column 12, line 49, "decree" should be --degree--.
Column 13, line 19, "0.30" should be --0.030--.
Column 17, line 58, "part" should be --port--.
Column 18, line 43, after "extending" insert --essentially--.
Column 21, line 67, "croos-" should be --cross- --.
Column 22, line 17, after "3" insert --free--.

UNITED STATES PATENT AND TRADEMARK OFFICE

CERTIFICATE OF CORRECTION

PATENT NO. : 4,034,377

DATED : July 5, 1977

INVENTOR(S) : Robert M. Knox and Peter P. Toulios

It is certified that error appears in the above-identified patent and that said Letters Patent are hereby corrected as shown below:

Column 23, line 16, "slat" should be --slab--;
line 25, "GHZ" should be --GHz--.
Column 24, line 61, after "protect" delete "with".

Signed and Sealed this

*Twenty-fifth* Day of *October 1977*

[SEAL]

*Attest:*

RUTH C. MASON
*Attesting Officer*

LUTRELLE F. PARKER
*Acting Commissioner of Patents and Trademarks*